US012160846B2

(12) United States Patent
Wang et al.

(10) Patent No.: US 12,160,846 B2
(45) Date of Patent: Dec. 3, 2024

(54) PAGING OVER SIDELINK

(71) Applicant: QUALCOMM Incorporated, San Diego, CA (US)

(72) Inventors: Kaidong Wang, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/407,009

(22) Filed: Aug. 19, 2021

(65) Prior Publication Data

US 2022/0061020 A1 Feb. 24, 2022

Related U.S. Application Data

(60) Provisional application No. 63/068,210, filed on Aug. 20, 2020.

(51) Int. Cl.
*H04W 4/00* (2018.01)
*H04B 7/00* (2006.01)
(Continued)

(52) U.S. Cl.
CPC ........... *H04W 68/005* (2013.01); *H04W 4/90* (2018.02); *H04W 92/18* (2013.01)

(58) Field of Classification Search
CPC ...... H04W 68/005; H04W 4/90; H04W 92/18
(Continued)

(56) References Cited

U.S. PATENT DOCUMENTS 11,026,210 B2  6/2021  Rune et al.
11,096,144 B2  8/2021  Bendlin et al.
(Continued)

FOREIGN PATENT DOCUMENTS

CN  109417433 A  3/2019
CN  110192414 A  8/2019
(Continued)

OTHER PUBLICATIONS

International Search Report and Written Opinion—PCT/US2021/046948—ISA/EPO—dated Nov. 24, 2021.
(Continued)

*Primary Examiner* — Mark G. Pannell
(74) *Attorney, Agent, or Firm* — Procopio, Cory, Hargreaves & Savitch LLP/QUALCOMM Incorporated

(57) ABSTRACT

Aspects presented herein may enable a base station to page a target UE in an idle mode via a relay UE. In one aspect, a first UE receives, from a base station, a paging relay request message including paging information for at least a second UE, each paging information including a UE identity for the second UE and a paging type. The first UE transmits a paging message from the first UE to the second UE over sidelink. In another aspect, a base station generates a paging relay request message including paging information for at least a second UE, the paging information indicating a UE ID for the second UE and a paging type. The base station transmits, to a first UE, the paging relay request message, the paging relay request message indicating a request for the first UE to relay paging information to the second UE over sidelink.

50 Claims, 25 Drawing Sheets

(51) Int. Cl.
*H04W 4/90* (2018.01)
*H04W 68/00* (2009.01)
*H04W 92/18* (2009.01)

(58) Field of Classification Search
USPC .................................................. 370/329
See application file for complete search history.

(56) References Cited

U.S. PATENT DOCUMENTS

| | | | |
|---|---|---|---|
| 11,140,660 | B2 | 10/2021 | Reimann et al. |
| 11,190,294 | B2 | 11/2021 | Sundstrom et al. |
| 11,272,562 | B2 | 3/2022 | Kim et al. |
| 11,284,372 | B2 | 3/2022 | Cox et al. |
| 11,438,736 | B2 | 9/2022 | Fehrenbach et al. |
| 11,470,575 | B2 | 10/2022 | Agiwal |
| 2011/0195738 | A1* | 8/2011 | Hapsari ............... H04W 76/40 455/517 |
| 2012/0178485 | A1* | 7/2012 | Zeira ................... H04W 68/00 455/515 |
| 2012/0281566 | A1* | 11/2012 | Pelletier ............ H04W 72/1221 370/252 |
| 2013/0184013 | A1* | 7/2013 | Chao ................... H04W 68/02 455/458 |
| 2014/0169282 | A1* | 6/2014 | Lee .................... H04W 68/005 370/329 |
| 2014/0370835 | A1* | 12/2014 | Wu ....................... H04W 4/90 455/404.1 |
| 2016/0165629 | A1* | 6/2016 | Dhomeja ........... H04W 72/1273 370/336 |
| 2019/0110179 | A1* | 4/2019 | Lee ..................... H04W 48/12 |
| 2019/0394812 | A1* | 12/2019 | Kuo ...................... H04W 4/02 |
| 2020/0015192 | A1 | 1/2020 | Chun |
| 2020/0053791 | A1 | 2/2020 | Ozturk et al. |
| 2020/0077253 | A1* | 3/2020 | Kim ..................... H04W 76/30 |
| 2020/0187152 | A1 | 6/2020 | Karampatsis |
| 2020/0187298 | A1 | 6/2020 | Chun |
| 2020/0245407 | A1 | 7/2020 | Shan et al. |
| 2021/0045098 | A1* | 2/2021 | Bi ........................ H04W 68/02 |
| 2022/0061021 | A1 | 2/2022 | Wang et al. |
| 2022/0322283 | A1 | 10/2022 | Ji et al. |
| 2022/0369411 | A1 | 11/2022 | Agiwal |
| 2022/0408226 | A1 | 12/2022 | Fehrenbach et al. |
| 2023/0050355 | A1 | 2/2023 | Laselva et al. |
| 2023/0180178 | A1 | 6/2023 | Yang |
| 2023/0180180 | A1 | 6/2023 | Dong |
| 2023/0337186 | A1 | 10/2023 | Toskala et al. |
| 2023/0354266 | A1 | 11/2023 | Xiang et al. |
| 2023/0413229 | A1 | 12/2023 | Wang et al. |

FOREIGN PATENT DOCUMENTS

| | | |
|---|---|---|
| CN | 110402605 A | 11/2019 |
| CN | 110463285 A | 11/2019 |
| CN | 110192414 B | 3/2022 |
| CN | 114424636 A | 4/2022 |
| CN | 110402605 B | 10/2022 |
| CN | 115023981 B | 4/2024 |
| DE | 112018001272 T5 | 11/2019 |
| EP | 3499975 A1 | 6/2019 |
| EP | 3569021 B1 | 10/2021 |
| EP | 3465956 B1 | 3/2022 |
| EP | 4070585 A4 | 1/2023 |
| EP | 3628133 B1 | 1/2024 |
| EP | 3777312 B1 | 1/2024 |
| EP | 4344325 A2 | 3/2024 |
| KR | 20240007933 A | 1/2024 |
| TW | I738678 B | 9/2021 |
| WO | 2017099837 A1 | 6/2017 |
| WO | 2017176043 A1 | 10/2017 |
| WO | 2017207014 A1 | 12/2017 |
| WO | 2018130896 A1 | 7/2018 |
| WO | 2018164821 A1 | 9/2018 |
| WO | 2018175760 A1 | 9/2018 |
| WO | 2018226034 A1 | 12/2018 |
| WO | 2021013337 A1 | 1/2021 |
| WO | 2021148711 A1 | 7/2021 |
| WO | 2022053347 A1 | 3/2022 |
| WO | 2022240194 A1 | 11/2022 |
| WO | 2024063752 A1 | 3/2024 |

OTHER PUBLICATIONS

Nokia, et al., "Further Discussion on Paging Relaying", 3GPP Draft, 3GPP TSG-RAN WG2 Meeting #98, R2-1704327_D2D_Paging_Discussion, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 5, 2017 (May 5, 2017), XP051263779, 4 Pages, Retrieved from the Internet: URL:http://www.3gpp.org/ftp/tsg_ran/WG2_RL2/TSGR2_98/Docs/ [retrieved on May 5, 2017] the whole document.

3GPP 3rd Generation Partnership Project, Technical Specification Group Services and System Aspects, Architecture Enhancements for 5G System (5GS) to Support Vehicle-to-Everything (V2X) Services (Release 16), Draft 3GPP TS 23.287 V16.2.0, Mar. 2020 (Mar. 2020), pp. 1-53, Section 5.4.

Apple, et al., "Discussion on NR Sidelink Relay Scenarios", 3GPP Draft, R2-2007099, 3GPP TSG-RAN WG2 Meeting #111e, 3rd Generation Partnership Project (3GPP), Mobile Competence Centre, 650, Route Des Lucioles, F-06921 Sophia-Antipolis Cedex, France, vol. RAN WG2. No. Online, Aug. 17, 2020-Aug. 28, 2020, Aug. 7, 2020 (Aug. 7, 2020), XP051911925, 5 Pages, p. 1-p. 5.

Huawei et al., "NR Paging Options", R2-1808440, 3GPP TSG-RAN WG2 #102, 3rd Generation Partnership Project, Mobile Competence Centre, 650, Route Des Lucioles, F-06921 Sophia-Antipolis Cedex, France, vol. RAN WG2, No. Busan, Korea, May 21, 2018-May 25, 2018, May 20, 2018, XP051444714, pp. 1-11, p. 1, Lines 1-12, Paragraph 1, p. 2, Lines 11-16, Paragraph 2, p. 3, Lines 1-19, 25, Paragraph 2.1, Figure 1, p. 1-p. 11, Lines 1 to 12 of p. 1 of Chapter 1 and Lines 1 to 19 of p. 3 of Chapter 2.1.

Lenovo, et al., "Alternative Paging Solution for an eRemote-UE Connected to an eRelay-UE", 3GPP Draft, SA WG2 Meeting #122, S2-174416_Paging_for_Remote_UE, 3rd Generation Partnership Project (3GPP), Mobile Competence Centre, 650, Route Des Lucioles, F-06921 Sophia-Antipolis Cedex, France, vol. SA WG2, No. San Jose Del Cabo, Jun. 26, 2017-Jun. 30, 2017, Jun. 25, 2017 (Jun. 25, 2017), XP051303268, 4 Pages, p. 1-p. 4.

LG Electronics Inc: "SI Request in RRC Connected", 3GPP Draft, R2-1803661, 3GPP TSG-RAN WG2 Meeting #101, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 16, 2018 (Feb. 16, 2018), XP051400684, pp. 1-2, p. 1-p. 2.

Mediatek Inc: "RRC States for Relaying", 3GPP Draft, R2-2006571, 3GPP TSG-RAN WG2 Meeting #111 electronic, 3rd Generation Partnership Project (3GPP), Mobile Competence Centre, 650, Route Des Lucioles, F-06921 Sophia-Antipolis Cedex, France, vol. RAN WG2, No. electronic, Aug. 17, 2020-Aug. 28, 2020, Aug. 7, 2020 (Aug. 7, 2020), XP051911514, 9 Pages, p. 1-p. 9.

Qualcomm Incorporated: "Further Discussion on Control Plane Procedures of L2 U2N Relay", 3GPP Draft, R2-2104738, 3GPP TSG RAN WG2 Meeting #114-e, 3rd Generation Partnership Project (3GPP), Mobile Competence Centre, 650, Route Des Lucioles, F-06921 Sophia-Antipolis Cedex, France, vol. RAN WG2, No. E-Conference, May 19, 2021-May 27, 2021, May 11, 2021 (May 11, 2021), XP052006502, 11 Pages, p. 1-p. 11.

Qualcomm Incorporated: "Further Discussion on Paging and SIB Forwarding in L2 U2N Relay", 3GPP Draft, 3GPP TSG RAN WG2 Meeting #115-e, R2-2107104, 3rd Generation Partnership Project (3GPP), Mobile Competence Centre, 650, Route Des Lucioles, F-06921 Sophia-Antipolis Cedex, France, vol. RAN WG2, No. E-Conference, Aug. 9, 2021-Aug. 27, 2021 Aug. 6, 2021 (Aug. 6, 2021), XP052033892, 9 Pages, p. 1-p. 9.

Qualcomm Incorporated: "Remaining Issues on L2 U2N Relay", 3GPP Draft, 3GPP TSG RAN WG2 Meeting #113-e, R2-2100124, 3rd Generation Partnership Project (3GPP), Mobile Competence

(56) References Cited

OTHER PUBLICATIONS

Centre, 650, Route Des Lucioles, F-06921, Sophia-Antipolis Cedex, France, vol. RAN WG2. No. E-Conference, Jan. 25, 2021-Feb. 5, 2021, Jan. 15, 2021 (Jan. 15, 2021), XP051973341, 23 Pages, The whole document, p. 1-p. 22.

Qualcomm Incorporated: "RRC State and Essential Rae Procedures in L2 U2N Relay", 3GPP Draft, 3GPP TSG RAN WG2 Meeting #112-e, R2-2008966, 3rd Generation Partnership Project (3GPP), Mobile Competence Centre, 650, Route Des Lucioles, F-06921 Sophia-Antipolis Cedex, France, vol. RAN WG2, No. E-Conference, Nov. 2, 2020-Nov. 13, 2020, Oct. 23, 2020 (Oct. 23, 2020), XP051942016, 8 Pages, p. 1-p. 8.

Vivo: "Further Discussion on L2 Control Plane Procedures", 3GPP Draft, R2-2104960, 3GPP TSG-RAN WG2 Meeting #114 electronic, 3rd Generation Partnership Project (3GPP), Mobile Competence Centre, 650, Route Des Lucioles, F-06921 Sophia-Antipolis Cedex, France, vol. RAN WG2, No. electronic, May 19, 2021-May 27, 2021, May 11, 2021 (May 11, 2021), XP052006700, 11 Pages, p. 1-p. 11.

* cited by examiner

PAGING OVER SIDELINK

CROSS REFERENCE TO RELATED APPLICATION(S)

This application claims the benefit of priority of Provisional Application Ser. No. 63/068,210, entitled "paging over sidelink" and filed on Aug. 20, 2020, which is expressly incorporated by reference herein in its entirety.

INTRODUCTION

The present disclosure relates generally to communication systems, and more particularly, to wireless communications including paging.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus receives, from a base station, a paging relay request message including paging information for a second UE. Then the apparatus transmits a paging message from the first UE to the second UE over sidelink In an aspect of the disclosure, a method, a computer-readable medium, and an apparatus are provided for wireless communication at a base station. The apparatus determines to page a first UE in an inactive state or an idle state. Then the apparatus transmits, to a second UE, a paging relay request message including paging information, the paging relay request message indicating a request for the second UE to relay paging information to the first UE over sidelink.

In an aspect of the disclosure, a method, a computer-readable medium, and an apparatus are provided for wireless communication at a first user equipment. The apparatus receives a paging message over sidelink from a second UE, the paging message including paging information indicating a paging type for a page from a base station. Then the apparatus receives information from the base station based on the paging type indicated in the paging message from the second UE.

In an aspect of the disclosure an apparatus is provided for wireless communication at a first UE. The apparatus includes a memory and at least one processor coupled to the memory, the memory and the at least one processor configured to receive, from a base station, a paging relay request message including paging information for at least a second UE, each paging information including a UE identity for the second UE and a paging type; and to transmit a paging message from the first UE to the second UE over sidelink.

In another aspect of the disclosure, a method is provided for wireless communication at a first UE. The method includes receiving, from a base station, a paging relay request message including paging information for at least a second UE, each paging information including a UE identity for the second UE and a paging type. Then, the method includes transmitting a paging message from the first UE to the second UE over sidelink.

In another aspect of the disclosure, an apparatus for wireless communication at a first UE is provided. The apparatus includes means for receiving, from a base station, a paging relay request message including paging information for at least a second UE, each paging information including a UE identity for the second UE and a paging type. The apparatus includes means for transmitting a paging message from the first UE to the second UE over sidelink.

In another aspect of the disclosure, a computer-readable storage medium storing computer executable code for wireless communication at a first UE is provided, the code when executed by a processor cause the processor to receive, from a base station, a paging relay request message including paging information for at least a second UE, each paging information including a UE identity for the second UE and a paging type; and to transmit a paging message from the first UE to the second UE over sidelink.

In an aspect of the disclosure, an apparatus is provided for wireless communication at a base station. The apparatus includes a memory and at least one processor coupled to the memory, the memory and the at least one processor configured to generate a paging relay request message including paging information for at least a second UE, the paging information indicating a UE ID for the second UE and a paging type; and to transmit, to a first UE, the paging relay request message, the paging relay request message indicating a request for the first UE to relay paging information to the second UE over sidelink.

In another aspect of the disclosure, a method is provided for wireless communication at a base station. The method includes generating a paging relay request message including paging information for at least a second UE, the paging information indicating a UE ID for the second UE and a paging type. Then, the method includes transmitting, to a first UE, the paging relay request message, the paging relay request message indicating a request for the first UE to relay paging information to the second UE over sidelink.

In another aspect of the disclosure, an apparatus for wireless communication at a base station is provided. The apparatus includes means for generating a paging relay request message including paging information for at least a second UE, the paging information indicating a UE ID for the second UE and a paging type. The apparatus includes means for transmitting, to a first UE, the paging relay request message, the paging relay request message indicating a request for the first UE to relay paging information to the second UE over sidelink.

In another aspect of the disclosure, a computer-readable storage medium storing computer executable code for wireless communication at a base station is provided, the code when executed by a processor cause the processor to generate a paging relay request message including paging information for at least a second UE, the paging information indicating a UE ID for the second UE and a paging type; and to transmit, to a first UE, the paging relay request message, the paging relay request message indicating a request for the first UE to relay paging information to the second UE over sidelink.

In an aspect of the disclosure, an apparatus is provided for wireless communication at a second UE. The apparatus includes a memory and at least one processor coupled to the memory, the memory and the at least one processor configured to receive a paging message over sidelink from a first UE, the paging message including paging information indicating a paging type for a page from a base station; and to receive information from the base station based on the paging type indicated in the paging message from the first UE.

In another aspect of the disclosure, a method is provided for wireless communication at a second UE. The method includes receiving a paging message over sidelink from a first UE, the paging message including paging information indicating a paging type for a page from a base station. Then, the method includes receiving information from the base station based on the paging type indicated in the paging message from the first UE.

In another aspect of the disclosure, an apparatus for wireless communication at a second UE is provided. The apparatus includes means for receiving a paging message over sidelink from a first UE, the paging message including paging information indicating a paging type for a page from a base station. The apparatus includes means for receiving information from the base station based on the paging type indicated in the paging message from the first UE.

In another aspect of the disclosure, a computer-readable storage medium storing computer executable code for wireless communication at a second UE is provided, the code when executed by a processor cause the processor to receive a paging message over sidelink from a first UE, the paging message including paging information indicating a paging type for a page from a base station; and to receive information from the base station based on the paging type indicated in the paging message from the first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
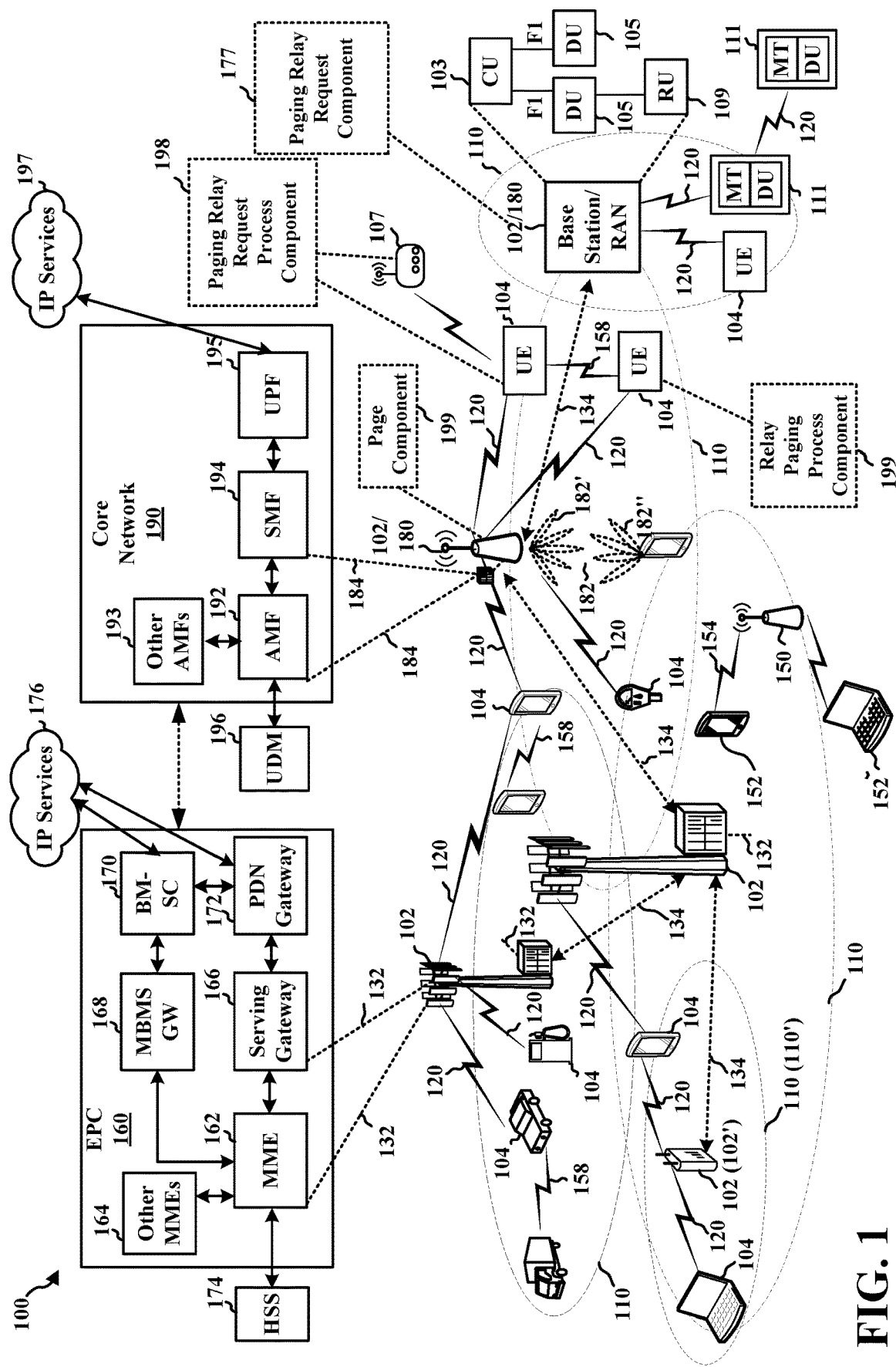
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregated, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

When there is no communication to be exchanged between a base station and a UE for a period of time, the UE may transition to a radio resource control (RRC) idle mode. If the base station receives data or information for the UE that is in the idle mode, the base station may page the UE in order to provide the data or information to the UE. The base station may send the page for any of a number of reasons, e.g., to trigger a radio resource control setup with the UE, to provide a system information modification to the UE, or to provide a public warning system notification to the UE. In some scenarios, if a UE in an idle mode moves out of the coverage of the base station, the UE may not reliably receive the paging message from the base station outside of the transmission range of the base station.

Aspects presented herein may enable a base station to reliably transmit one or more paging messages to a UE that is outside the transmission range of the base station. Aspects presented herein may enable a base station to page a target UE in an idle mode. Aspects of the present application provide for improved coverage for the page by transmitting a message (e.g., a relay message) to another wireless device (e.g., a relay UE) to be relayed to the target UE over sidelink. A relay UE may receive paging information for the target UE from the base station and may provide the paging information to the target UE over sidelink. The term "relay UE" means a UE that receives the page from the base station and transmits information about the page, or the page itself, to the target UE. The term "target UE" means the UE that the base station is attempting to page, e.g., the UE to which the content of the page is directed. The relay UE may be in a position to reliably receive the page from the base station and to reliably transmit over sidelink to the target UE. The provision of the paging information to the UE through a distributed environment provided by sidelink may help to improve latency, reliability, and efficiency of the wireless communication system. For example, a UE may still be able to receive one or more messages associated with paging from a base station if the UE is not within a transmission range of the base station.

According to one or more aspects, the base station may send a paging relay request message on a physical downlink shared channel (PDSCH) that contains a paging type and/or a short message. The paging type may indicate a triggering RRC setup, a system information modification, and/or an emergency message, etc. In one example, the triggering RRC setup may be for a Uu interface or for a sidelink interface (e.g., a PC5 interface). The short message may indicate random access resources for the target UE to perform random access with the base station or sidelink resources for a unicast connection setup, e.g., for an RRC setup.

In response to receiving the paging relay request message, the relay UE may send a paging message to the target UE over sidelink. The paging message may include one or more (or a list of) paging records, in some examples. Each paging record may include a paging type and/or a short message. The paging type may indicate a triggering RRC setup, a system information modification, an emergency message, etc. The short message may indicate random access resources for the target UE to perform random access with the base station or sidelink resources for a unicast connection setup, e.g., for an RRC setup, new system information, and/or an emergency message, etc. The paging message may include one or more paging records for a target UE identifier, if the target UE identifier is known by the relay UE. If the relay UE does not know the target UE identifier, the paging message may include a full paging record list from a paging message received by the relay UE from the base station. For purpose of the present disclosure, the term "paging record" or "paging records" may include paging history, paging-related information, information related to one or more past paging(s) (e.g., from base station), etc.).

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a paging relay request process component 198 configured to relay a paging from a base station to another UE. In one configuration, the paging relay request process component 198 may be configured to receive, from a base station, a paging relay request message including paging information for at least a second UE, each paging information including a UE identity for the second UE and a paging type. In such configuration, the paging relay request process component 198 may transmit a paging message from the first UE to the second UE over sidelink.

In certain aspects, the UE 104 may include a relay paging process component 199 configured to receive a paging from a base station via another UE. In one configuration, the relay paging process component 199 may be configured to receive a paging message over sidelink from a first UE, the paging message including paging information indicating a paging type for a page from a base station. In such configuration, the relay paging process component 199 may receive information from the base station based on the paging type indicated in the paging message from the first UE.

In certain aspects, the base station 102 may include a paging relay request component 177 configured to request a first UE to relay a paging message to a second UE for the base station 102. In one configuration, the paging relay request component 177 may be configured to generate a paging relay request message including paging information for at least a second UE, the paging information indicating a UE ID for the second UE and a paging type. In such configuration, the paging relay request component 177 may transmit, to a first UE, the paging relay request message, the paging relay request message indicating a request for the first UE to relay paging information to the second UE over sidelink.

The base stations 102 configured for 4G LTE (collectively referred to as Evolved Universal Mobile Telecommunications System (UNITS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 109 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
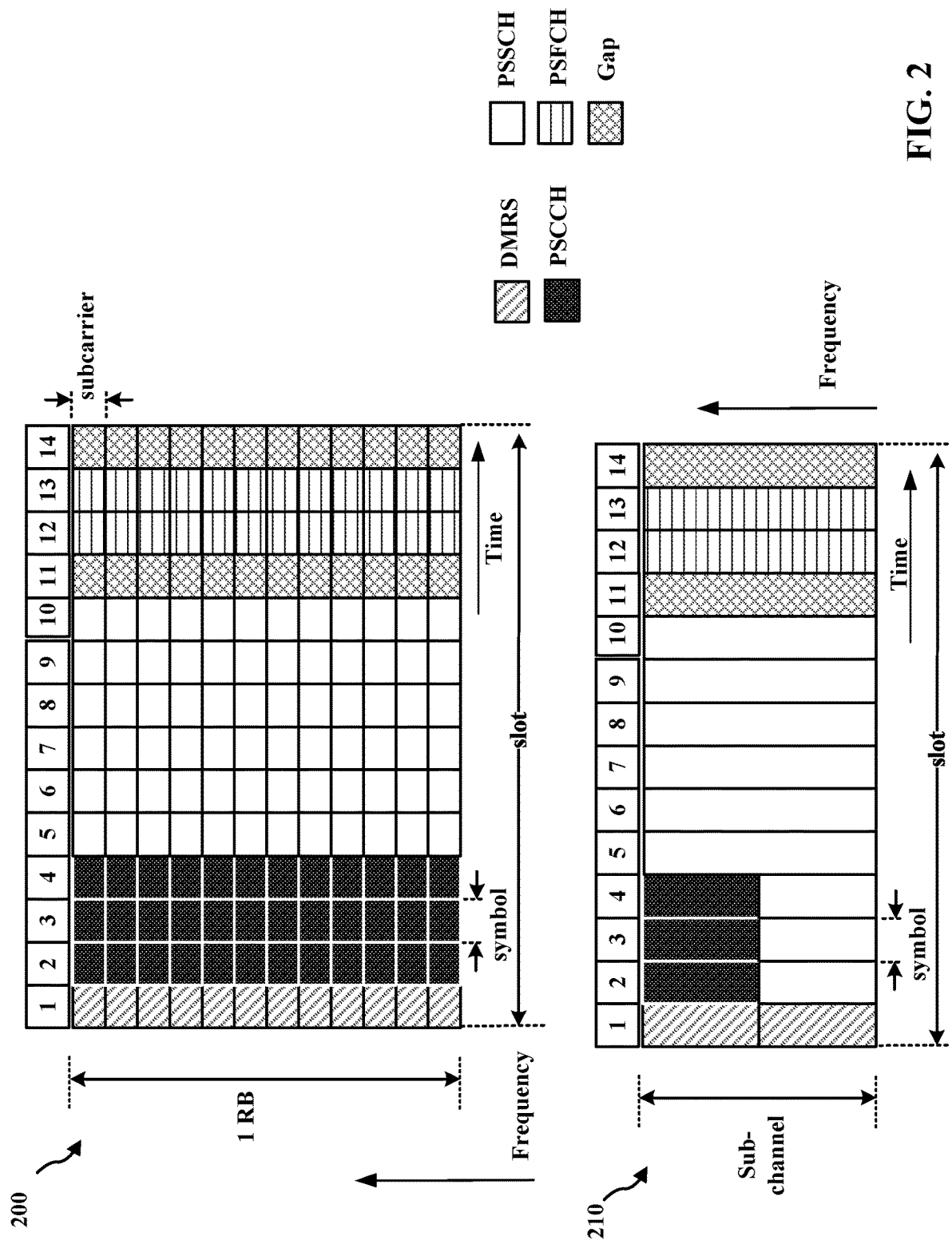
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
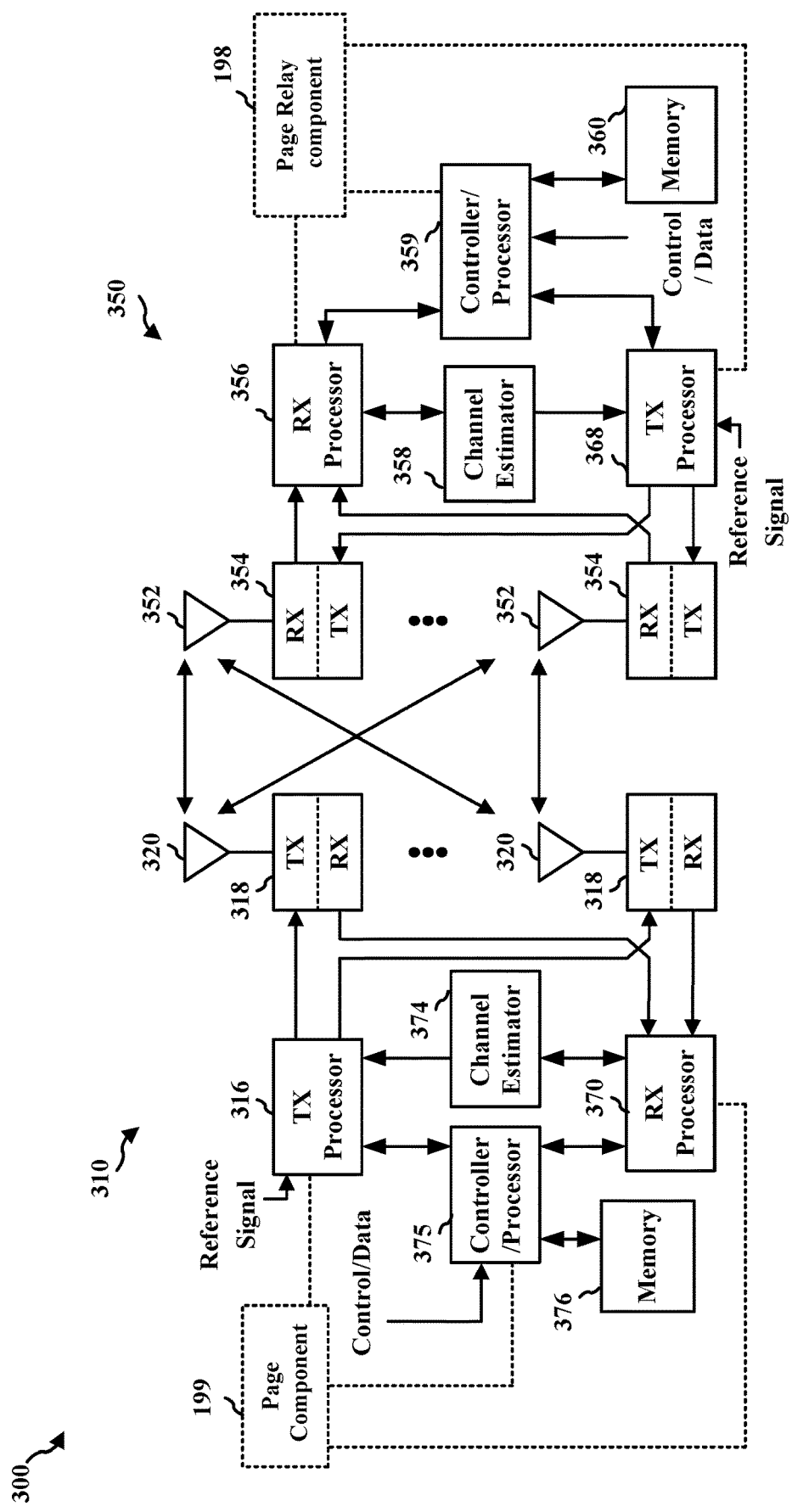
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink (e.g., using a PC5 interface). The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the paging relay request process component 198 of FIG. 1. In another example, at least one of the TX processor 368, the RX processor 356, and the controller/processor 359 may be configured to perform aspects in connection with the relay paging process component 199 of FIG. 1. In another example, at least one of the TX processor 368, the RX processor 356, and the controller/processor 359 may be configured to perform aspects in connection with both paging relay request process component 198 and the relay paging process component 199 of FIG. 1. In another example, at least one of the TX processor 316, the RX processor 370, and the controller/processor 375 may be configured to perform aspects in connection with the paging relay request component 177 of FIG. 1.

A base station (e.g., the base station 102 or 180) may page a UE (e.g., UE 104) for various reasons. For example, the base station may page the UE to trigger RRC setup. The base station may page a UE in an RRC idle or RRC inactive state to trigger a transition to an RRC connected state in order to transmit data to the UE, for example. The base station may page a UE to indicate a modification of system information to the UE. The base station may page a UE to provide an alert, such as a public warning system alert, an earthquake and tsunami warning system (ETWS) notification, commercial mobile alert system (CMAS) notification, and/or an emergency message notification, etc. The UE may operate based on a discontinuous reception (DRX) cycle in which the UE wakes up (e.g., from a sleep mode) to monitor a paging occasion (PO). If the UE does not receive a page, the UE may return to the sleep mode or a lower power mode in which the UE does not monitor for a physical downlink control channel (PDCCH) from the base station. If the UE does receive a page from the base station, the UE may prepare to receive additional downlink messages from the base station. The UE may monitor one paging occasion per discontinuous reception (DRX) cycle, in some examples. The paging occasion may include a set of PDCCH monitoring occasions and may include multiple time slots in which the UE may receive paging DCI from the base station.

In order to page the UE, the base station may send a PDCCH message that indicates resources for a corresponding physical downlink shared channel (PDSCH). For example, the PDCCH message may be a downlink control information (DCI) format 1_0 message for which the base station scrambles the cyclic redundancy check (CRC) bits using a paging radio network temporary identifier (P-RNTI). If the UE receives the DCI and determines that the DCI has been scrambled with the P-RNTI, the UE may receive the corresponding paging message on the PDSCH and determine whether the PDSCH indicates that the UE is being paged (e.g., in an associated paging occasion). The paging message in the PDSCH may include a UE identifier that the UE uses to determine whether the paging message is directed to the UE. If the UE's identifier is included in the PDSCH associated with the DCI scrambled with the P-RNTI, the UE may determine that the base station is paging the UE and may continue to monitor for communication from the base station.

Figure 4:
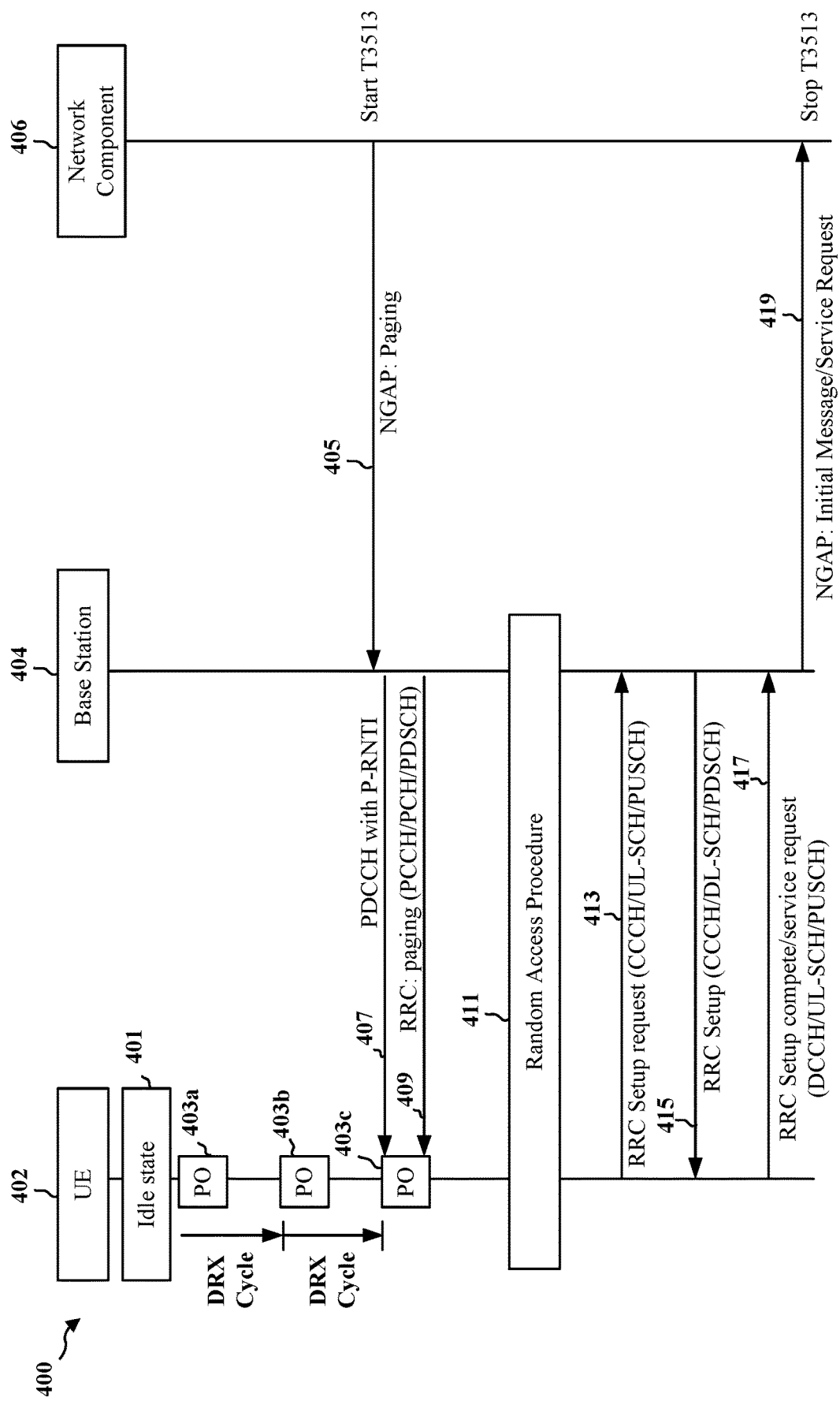
FIG. 4 illustrates an example communication flow for paging a base station to page a UE in accordance with various aspects of the present disclosure.

FIG. 4 illustrates an example communication flow 400 that includes paging a UE in an RRC idle state. In FIG. 4, a UE 402 is in an RRC idle state 401. The UE 402 monitors for PDCCH(s) from the base station 404 during paging occasions 403a, 403b, and 403c according to a DRX cycle that the base station 404 configured for the UE 402. The base station 404 receives paging information 405 for the UE 402 from the network 406, e.g., from an AMF such as AMF 192 in FIG. 1. In response to receiving the paging information 405 from the network 406, the base station 404 transmits a PDCCH 407 having the CRC bits scrambled with a P-RNTI to the UE 402 during the paging occasion 403c, where the PDCCH 407 indicates resources for a corresponding PDSCH 409. In response to receiving the PDCCH 407 based on the P-RNTI, the UE 402 receives the PDSCH 409 that includes a paging message for the UE 402. The paging message may indicate an identifier for the UE 402 that informs the UE 402 the paging message is for the UE 402. In response to receiving the paging message in the PDSCH 409, the UE 402 transitions to an RRC connected state with the base station 404. The UE 402 may perform steps of a random access procedure 411 in order to establish, or re-establish, the RRC connection with the base station 404. Following the random access procedure 411, the UE 402 may transmit an RRC setup request 413 to the base station 404. The base station 404 may respond with an RRC set up message 415, and the UE 402 may respond with an RRC set complete message and/or a service request 417 for the network. If the UE 402 transmits a service request, the base station 404 sends the initial message/service request 419 to the network 406. As shown by FIG. 4, the base station 404 may not have the context for UEs in an RRC idle state. Thus, the core network, e.g., the AMF, initiates the paging to the UE by sending an NG application protocol (NGAP) paging message to the base station 404 to initiate the paging to the target UE 402. The base station 404 then sends the RRC paging message (e.g., via PDSCH 409) to the target UE 402. For purpose of the present disclosure, the "target UE" may refer to the UE to which the paging is directed or the final recipient of the paging message.

Figure 5:
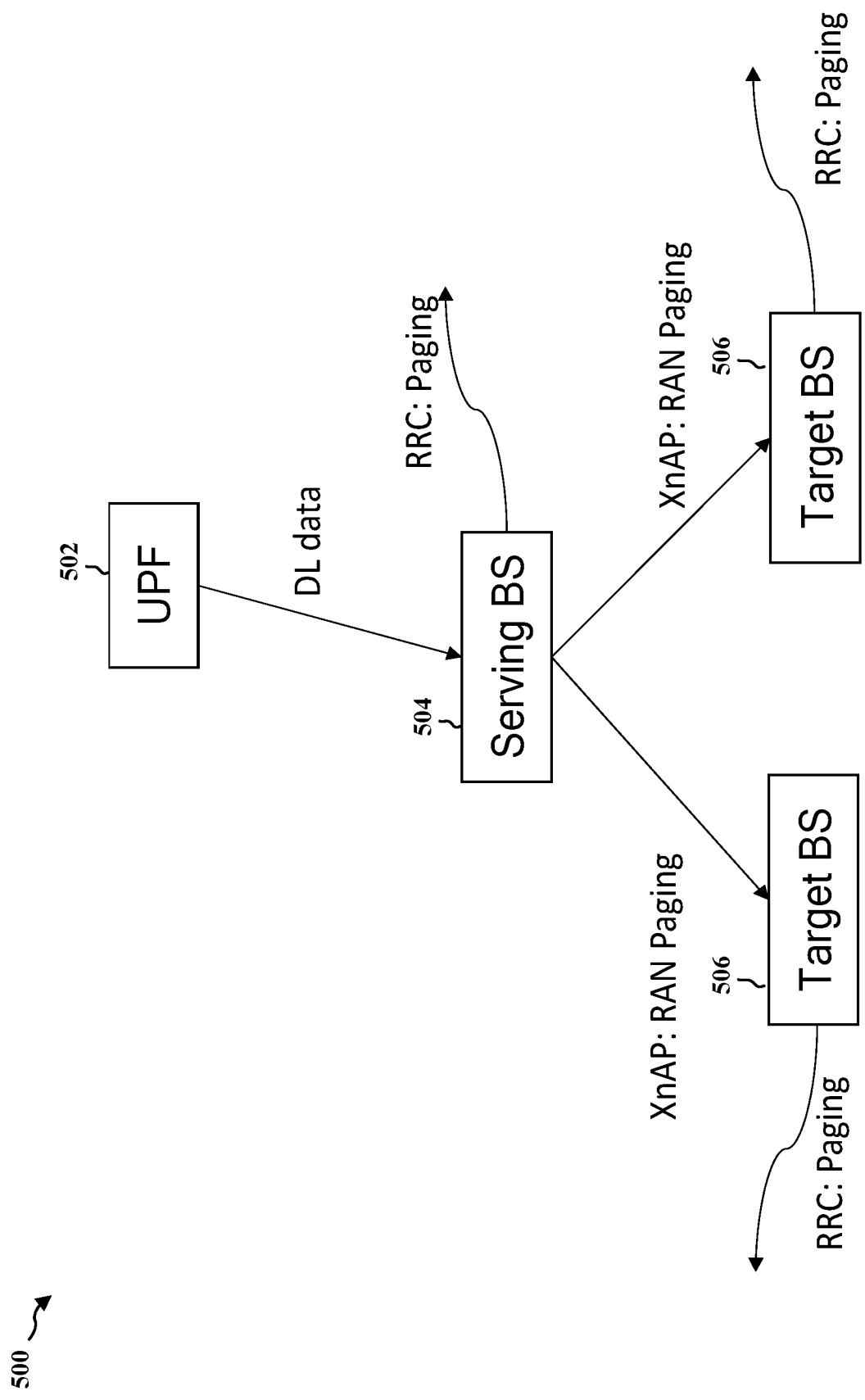
FIG. 5 illustrates an example of a serving base station initiating paging of a UE by target base stations in accordance with various aspects of the present disclosure.

For a UE in an RRC inactive state rather than an RRC idle state, the serving base station may have the context of the UE. Thus, the serving base station may initiate paging for the target UE. FIG. 5 illustrates an example 500 in which a serving base station 504 receives a downlink data for a target UE from the core network, e.g., from UPF 502. The serving base station 504 sends an Xn Access Protocol (XnAP) paging message for the target UE to one or more target base stations 506. The target base station(s) 506 then transmit the RRC paging message to the target UE, as described in connection with 407 and 409 in FIG. 4. When the inactive target UE receives the paging message, the inactive target UE may re-establish the connection with the base station in order to receive the downlink data.

Figure 6:
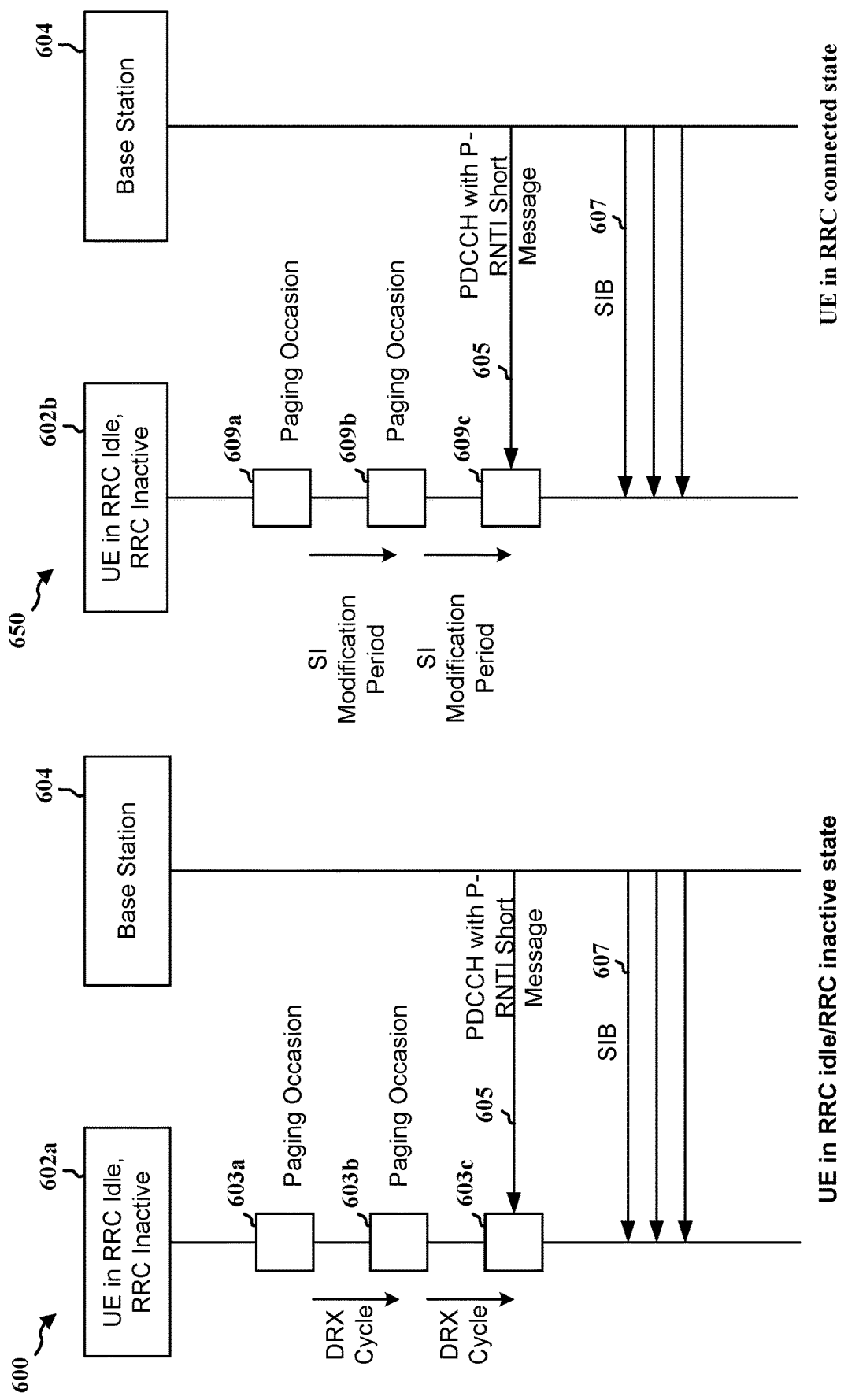
FIG. 6 illustrates examples of paging a UE to provide a system information modification in accordance with various aspects of the present disclosure.

FIG. 6 illustrates an example communication flow 600 for paging an inactive or idle UE to update system information and an example communication flow 650 for paging an RRC connected UE to update system information. In FIG. 6, the UE, whether the UE 602*a* in the RRC idle state or the RRC inactive state or the UE 602*b* in the RRC connected state, monitors for PDCCH from the base station 604 during paging occasions. When the UE receives a page 605, e.g., a PDCCH having the CRC bits scrambled with a P-RNTI, the UE monitors for updated system information 607. After sending the page 605, the base station 604 may transmit the updated system information 607 multiple times or in multiple messages to the UE, as illustrated in FIG. 6. The PDCCH transmitted as the page 605 may include a message indicating that the page is for the system information update. For example, the message may be in DCI format 1_0 that indicates the system information has been updated or that indicates an upcoming warning message, e.g., an ETWS/CMAS message. In the communication flow 600, the paging occasions 603*a*, 603*b*, and 603*c* for the UE 602*a* may be based on a DRX cycle of the UE 602*a*. The paging occasions 609*a*, 609*b*, 609*c* for the UE 602*b* may be based on a system information modification period. For examples in FIG. 6, there may be no use of an NGAP message, an XnAP message or an RRC paging message, and the page may instead be provided to the UE 602*a* or 602*b* through the PDCCH transmission, e.g., page 605.

Figure 7:
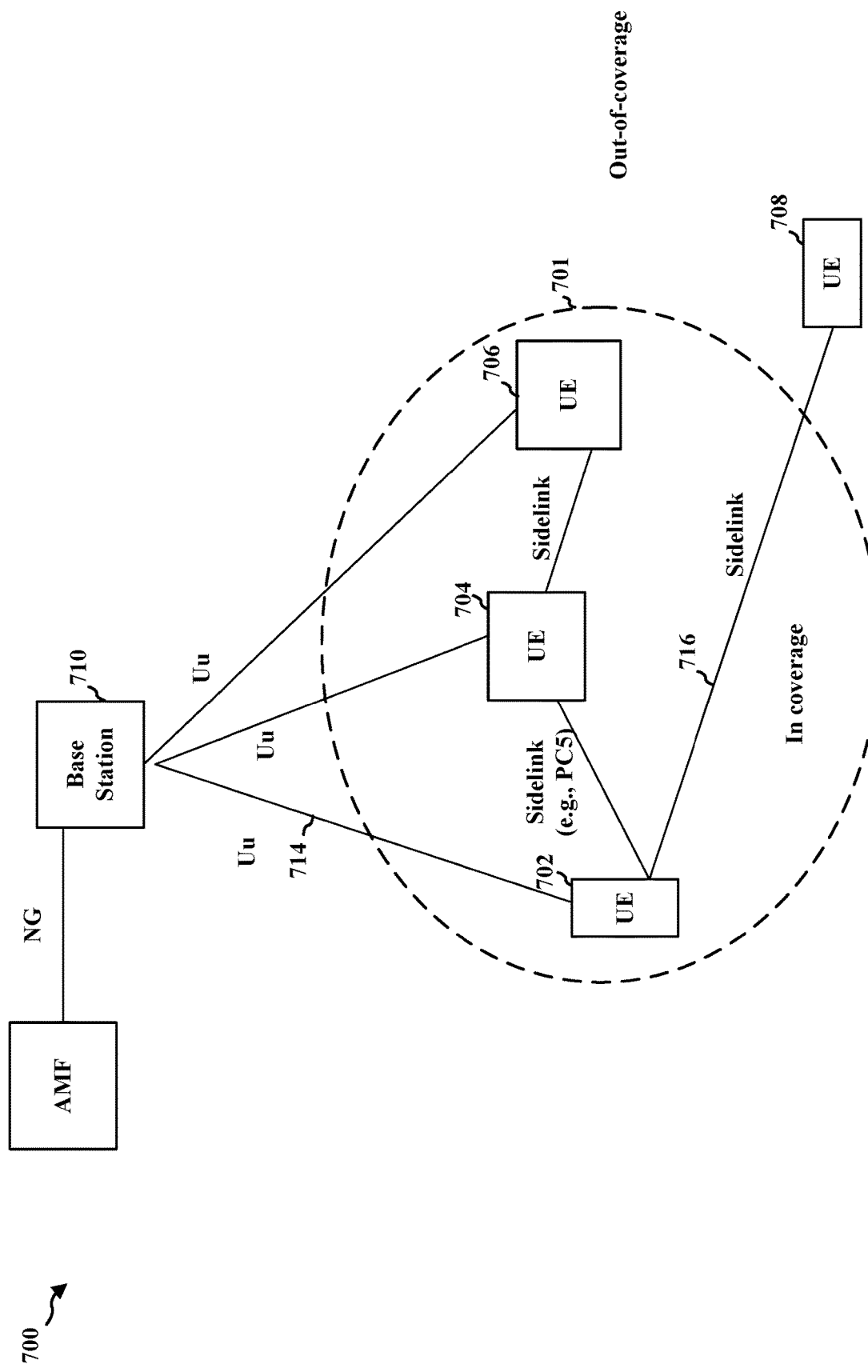
FIG. 7 illustrates an example of a communication system including UEs in coverage of a base station and out of coverage of the base station in accordance with various aspects of the present disclosure.

At times, a UE may be out of coverage of a base station. FIG. 7 illustrates a communication system 700 including a base station 710 that provides a range of coverage 701. The UEs 702, 704, and 706 are within the coverage 701 of the base station 710, whereas the UE 708 is outside of the coverage of the base station 710. If the base station 710 has a paging message for the UE 708, the UE 708 may not be able to receive the paging message directly from the base station 710. Aspects presented herein provide for a paging message to be relayed to the out-of-coverage UE 708 over sidelink. For example, a wireless device that is within the coverage 701 may receive the paging message from the base station 710 and provide the paging information to the out-of-coverage UE 708. For example, a UE 702 that is in the coverage 701 may receive the paging message for the UE 708 from the base station 710 over an access link 714 with the base station 710 based on an Uu interface and may provide the paging message or information from the paging message to the out of coverage UE 708 over a sidelink 716 based on sidelink (e.g., over a PC5 interface). The UE 708 that is the recipient of the paging message may be referred to herein as the "target UE." The UE 702 that receives the paging message from the base station 710 and provides paging information to the target UE may be referred to as a "relay UE." Although aspects are described herein for a relay "UE," the aspects may be applied by any device capable of transmitting via sidelink, such as an RSU, etc.

Figures 8A, 8B:
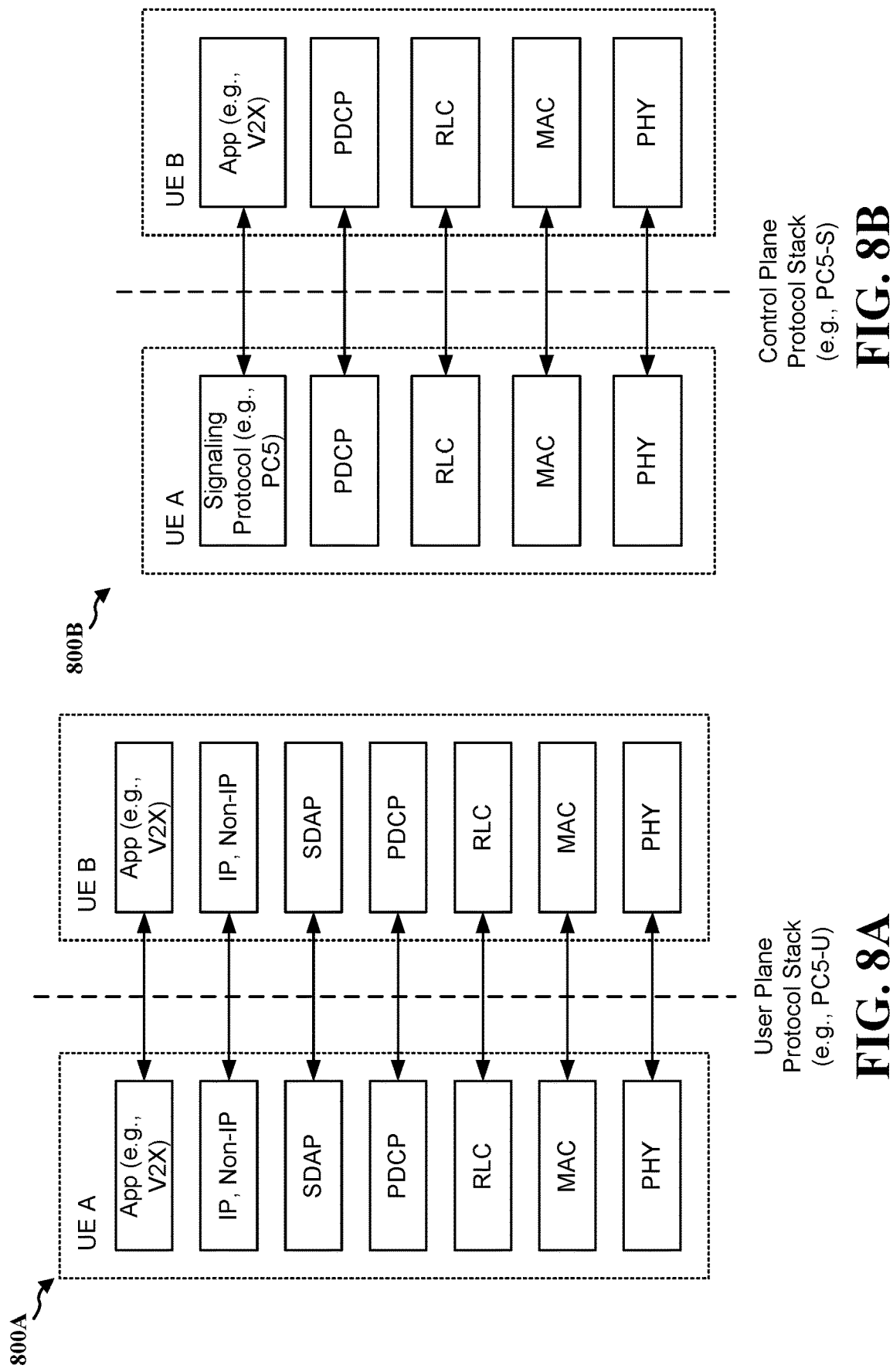
FIG. 8A is a diagram illustrating an example of a user plane protocol stack in accordance with various aspects of the present disclosure.
FIG. 8B is a diagram illustrating an example of a signaling protocol stack in accordance with various aspects of the present disclosure.

To establish a communication over sidelink, a user-level protocol stack may be used for exchanging user data and a control level protocol stack may be defined for exchanging control messages. FIG. 8A is a diagram 800A illustrating an example of a user plane protocol stack for a sidelink communication. In some examples, the user plane protocol stack may correspond to a user plane for a PC5 reference point (e.g., PC5-U) supporting V2X services, as an example of sidelink communication, for a first UE (UE A) and a second UE (UE B). IP and Non-IP Packet Data Convergence Protocol (PDCP) Service Data Unit (SDU) types may be supported for the sidelink communication. FIG. 8B is a diagram 800B illustrating an example of a signaling protocol stack for a sidelink communication. In some examples, the signaling protocol stack may correspond to a control plane for a PC5 reference point (e.g., PC5-S) for the first UE (UE A) and the second UE (UE B). In some examples, sidelink messages may be carried in RRC signaling. The physical (PHY) layer may transmit sidelink data (e.g., using 10 MHz, 20 MHz, or other bandwidths, etc.). The MAC layer may manage packet flow control and resource allocation. The radio link control (RLC) layer may enable upper layer Protocol Data Units (PDUs) to be transferred in various modes (e.g., Acknowledged Mode, Unacknowledged Mode and Transparent Mode, etc.), and the RLC layer may also ensure proper concatenation, segmentation and reassembly for RLC SDUs.

In some examples, a sidelink message (e.g., a message transmitted via sidelink 716) may include a Layer-2 identifier (L2 ID) for sidelink communication over the PC5 reference point. For example, each UE may have one or more L2 IDs for sidelink communication. The L2 ID may include one or more source L2 IDs and/or one or more destination L2 IDs. The source and/or destination L2 IDs may be included in Layer-2 frames that are sent on a Layer-2 link from the relay UE to the target UE. In one configuration, the source L2 IDs may be self-assigned by the UE originating the corresponding Layer-2 frames.

In some examples, the destination L2 ID may be mapped to a sidelink (e.g., V2X) service type of the sidelink application for broadcast. In some examples, the destination L2 ID may be mapped to a sidelink (e.g., V2X) service type of the sidelink application for groupcast. A default destination L2 ID may be mapped for initial signaling to establish a unicast connection and the service type of the sidelink application. The sets of mapping information may be provisioned to the UE.

In some examples, the selection of the destination L2 ID may depend on the type of sidelink communication, e.g., whether the sidelink communication is unicast, broadcast, or groupcast, etc. For example, the destination L2 ID for broadcast sidelink communication may be selected based on a mapping between the service type (e.g., a PSID/ITS-AID) and a L2 ID. For groupcast sidelink communication, group identifier information may be provided by the application layer (e.g., V2X application layer), and the UE may convert the provided group identifier into a destination L2 ID. Otherwise, if the group identifier information is not provided, the UE may determine the L2 ID based on a mapping between the service type (e.g., a provider service identifier (PSID)/intelligent transportation system application identifier (ITS-AID)) and a L2 ID. For unicast sidelink communication, the initial signaling for the establishment of a unicast link (e.g. a PC5 unicast link) may use a known L2 ID of the communication peer, or a default destination L2 ID associated with the sidelink service type (e.g. PSID/ITS-AID) configured for a unicast link establishment. During the unicast link establishment procedure, L2 IDs may be exchanged between two UEs, and may be used for future communication between the two UEs. A UE may establish multiple unicast links with a peer UE and use the same or different source L2 IDs for these unicast links. For example, a relay UE (e.g., 702) may relay paging information to the target UE (e.g., 708) over sidelink (e.g., 716) using a L2 ID based on the type of communication (e.g., unicast, broadcast, or groupcast) and/or based on any of these additional aspects.

Figure 9:
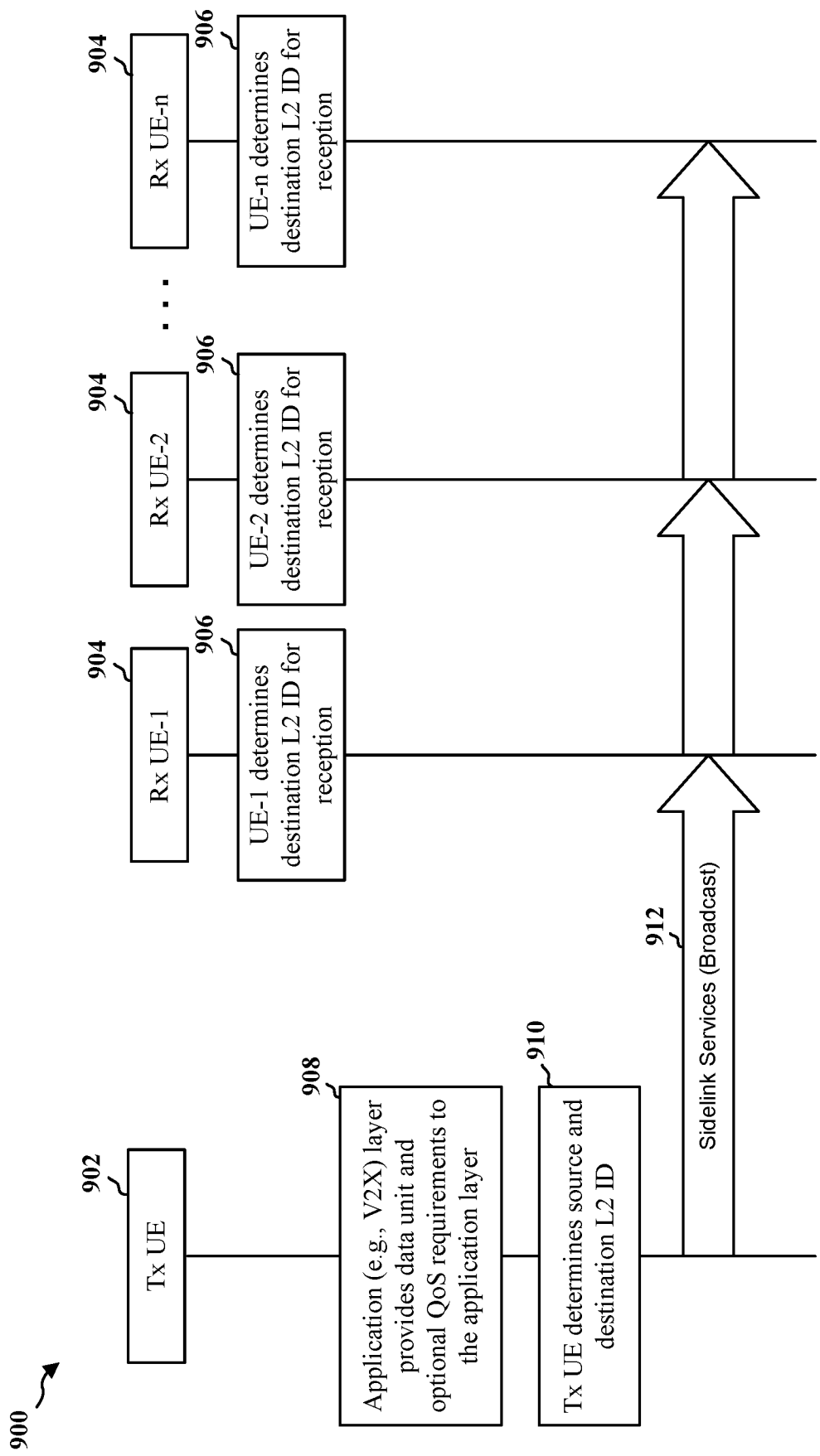
FIG. 9 is a diagram illustrating an example of a broadcast procedure over sidelink in accordance with various aspects of the present disclosure.

FIG. 9 is a diagram 900 illustrating an example of a broadcast procedure over sidelink from a transmitting UE 902 (e.g., a Tx UE) to one or more receiving UE(s) 904 (e.g., Rx UE-1, Rx UE-2 . . . Rx UE-n). At 906, the receiving UE(s) 904 may determine a destination L2 ID for broadcast reception. At 908, the transmitting UE 902's sidelink (e.g., V2X) application layer may provide a data unit for the transmitting UE 902. Then at 910, the transmitting UE 902 may determine the destination L2 ID for broadcast. At 912, the transmitting UE 902 may send (e.g., broadcast) a sidelink service data (e.g., a V2X service data) using the source L2 ID and the destination L2 ID.

Figure 10:
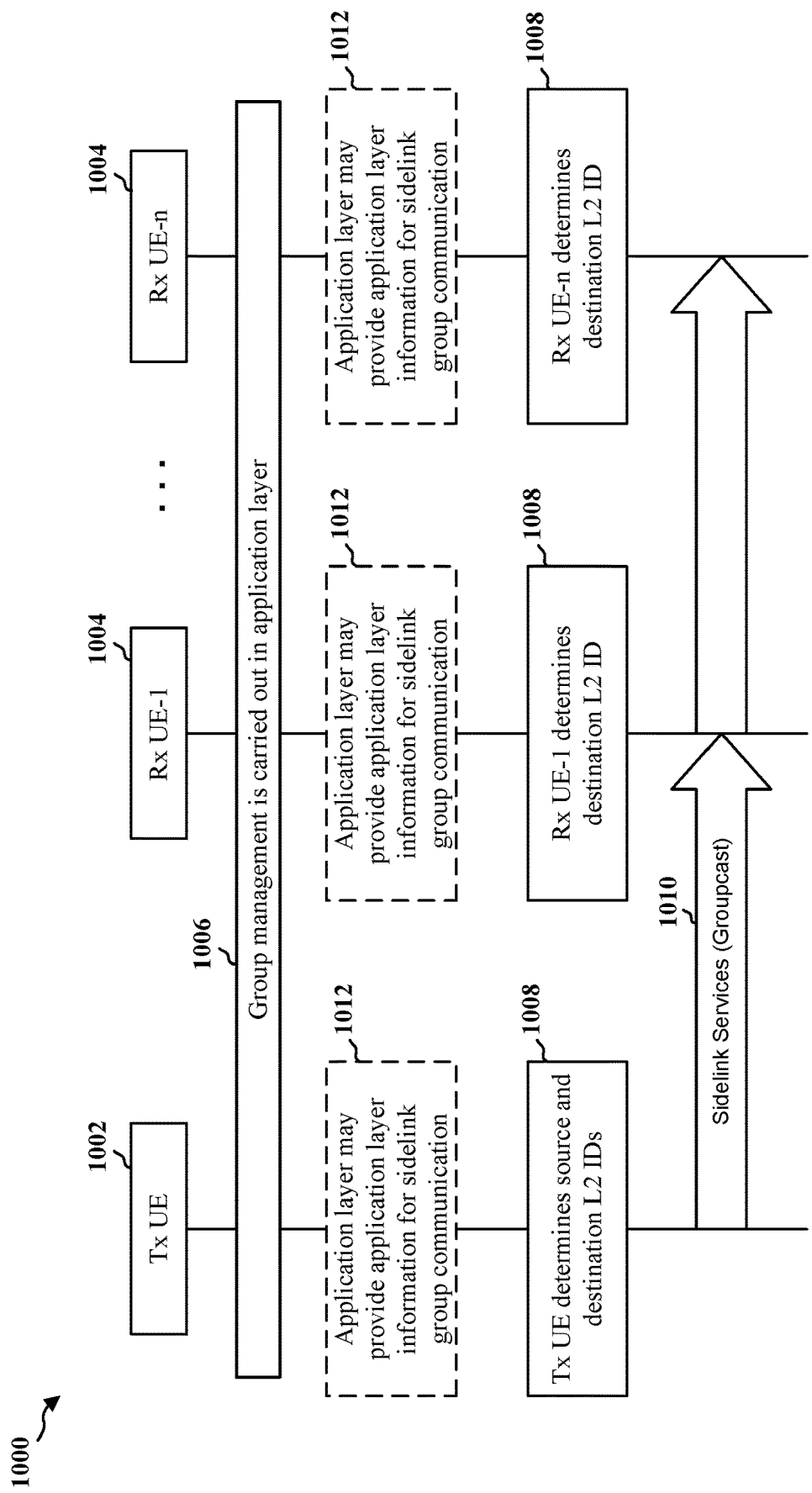
FIG. 10 is a diagram illustrating an example of the groupcast procedure over sidelink in accordance with various aspects of the present disclosure.

FIG. 10 is a diagram 1000 illustrating an example of a groupcast procedure over sidelink. At 1006, a sidelink (e.g., V2X) group management may be carried out by the application layer at the transmitting UE 1002 and one or more receiving UE(s) 1004. At 1008, the transmitting UE 1002 may determine a source L2 ID and a destination L2 ID, and the receiving UE(s) 1004 may determine a destination L2 ID. Then at 1010, the transmitting UE 1002 may send the sidelink service data (e.g., in groupcast) using the source L2 ID and the destination L2 ID. Additionally, at 1012, before the transmitting UE 1002 determines the source and the destination L2 IDs and/or before the receiving UE(s) 1004 determines the destination L2 ID, the application layer may provide a group identifier information (e.g., an application-layer V2X group identifier) to the transmitting UE 1002 and/or the receiving UE(s) 1004.

Figure 11:
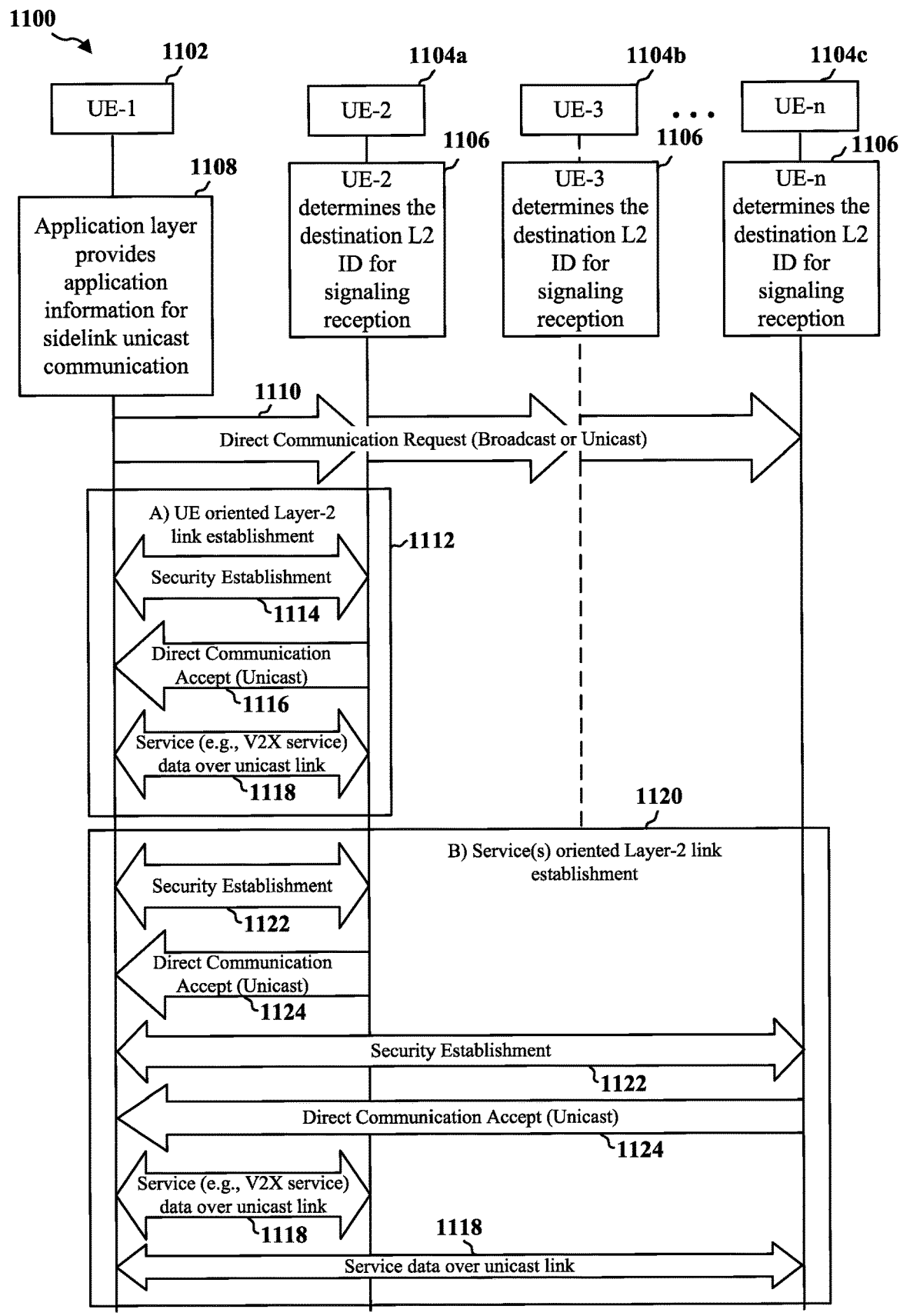
FIG. 11 is a diagram illustrating an example of the unicast procedure over sidelink in accordance with various aspects of the present disclosure.

FIG. 11 is a diagram 1100 illustrating an example of a unicast procedure over sidelink. At 1106, one or more UEs (e.g., UE-2 1104*a*, UE-3 1104*b*, UE-n 1104*c*, etc.) may determine the destination L2 ID for a unicast link (e.g., a PC5 unicast link) establishment. At 1108, the sidelink (e.g., V2X) application layer in UE-1 1102 may provide application information for the sidelink communication. Then, at 1110, the UE-1 1102 may send a direct communication request message (e.g., in groupcast or unicast) to the one or more UEs to initiate the unicast Layer-2 link establishment procedure. The UE-1 1102 may established the security with the one or more UEs based on at least one of the following ways. In one configuration, if a target user information (e.g., Target User Info) is included in the direct communication request transmitted from the UE-1 1102 (e.g., at 1110), such as for a UE oriented Layer-2 link establishment 1112, then at 1114, the target UE (e.g., UE-2 1104*a*) may respond to the direct communication request message by establishing the security with the UE-1 1102. If the target user information is not included in the direct communication request message (e.g., no specified target user), such as for a sidelink (e.g., V2X) service(s) oriented Layer-2 link establishment 1120, then at 1122, UEs (e.g., UE-2 1104*a*, UE-n 1104*c*) that are interested in using the announced sidelink service(s) (e.g., V2X Services) over a sidelink with the UE-1 1102 may respond to the direct communication request message by establishing the security with the UE-1 1102.

After the security is established (e.g., at 1114 or 1122), a direct communication accept message may be sent to UE-1 1102 by the target UE (e.g., UE-2 1104*a*) for the UE oriented Layer-2 link establishment 1112 or by the UEs (e.g., UE-2 1104*a* and/or UE-n 1104*c*) that are interested in using the announced sidelink service(s) for the sidelink service(s) oriented Layer-2 link establishment 1120. For example, at 1116, the target UE-2 1104*a* may respond to the UE-1 1102 with a direct communication accept message if the Application Layer ID for the UE-2 1104*a* matches. Similarly, UEs (e.g., UE-2 1104*a* and/or UE-n 1104*c*) that are interested in using the announced sidelink service(s) may respond to the direct communication request by sending a direct communication accept message, such as shown at 1124. After the direct communication is established between the UE-1 1102 and the one or more UEs, at 1118, the UE-1 1102 may sends sideline service data based on the source L2 ID and the destination L2 ID to the one or more UEs (e.g., UE-2 1104*a* and/or UE-n 1104*c*) that have accepted the direct communication.

Aspects presented herein may provide for extended network coverage for paging messages by relaying paging messages from a base station over sidelink. If a target UE is out of coverage and the base station is unable to page the UE directly, the base station may request a relay UE to forward the paging message to the target UE in order to reach the target UE. In some examples, the transmission of a paging message may fail because a channel state between the base station and the target UE may have changed. The relayed paging presented herein may enable the base station to diversify a communication by transmitting repetition of a paging message to a target UE via different sidelink(s). The added diversity may reduce the latency for the target UE to receive the paging message and connect to the base station to receive the pending data from the base station. In some examples, the base station may combine paging messages for multiple target UEs into a single relay message to a relay UE. The combined paging message may reduce signaling overhead on the Uu link between the base station and the paging UE.

Aspects presented herein may enable a base station, a relay UE and/or a target UE to use different types of paging related messages or to include different types of paging information in paging messages to improve the efficiency, latency and reliability of a paging process. In one aspect, a base station (e.g., the base station 1230) may send a paging relay request message (e.g., the paging relay request message 1232) to a relay UE (e.g., the relay UE 1202) on an access link, such as via a PDSCH. The paging relay request message may include the paging type and/or a short message. The paging type may indicate at least one of the following types for the paging: a triggering RRC Setup, a system information modification, and/or an ETWS/CMAS message, etc. If the paging type indicates that the paging (e.g., from the base station to the target UE) is to trigger the RRC setup of the target UE (e.g., through the Uu or the PC5 interface), the base station may use the short message to indicate the wireless resources for the random access or the unicast connection establishment, such as shown by Table 1 below. For example, the base station may indicate one or more PRACH resources for a random access (e.g., after the target UE receives the paging message) in the short message if the RRC setup for the target UE is triggered through the Uu interface, and the base may indicate the sidelink resources for a unicast connection setup (e.g., for the target UE to establish communication with the relay UE) in the short message if the RRC setup for the target UE is triggered through sidelink (e.g., a PC5 interface). On the other hand, if the paging type indicates a system information modification or an ETWS/CMAS message, then the base station may not use the short message or include any short message in the paging relay request message. In one example, as the short message may be optional or additional, if the base station does not include the resources for the PRACH for the random access or the resources for the sidelink for unicast connection setup, the target UE may select the resource on its own.

TABLE 1

Example of paging type and short message in the paging relay request message

| Paging Type | Short Message (May be additional) |
|---|---|
| Triggering RRC Setup through Uu | PRACH resources for random access |
| Triggering RRC Setup through sidelink | sidelink resource for unicast connection |

In another aspect, after receiving the paging relay request message from the base station, the relay UE may send a paging message to the target UE over the sidelink, where the paging message may be an RRC setup triggering message, a system information modification message, a ETWS/CMAS notification message, an emergency message/notification, or a combination thereof. In a non-sidelink communication between a base station and a UE (e.g., on the Uu interface), different types of paging message may be indicated to the UE differently. For example, as shown by Table 2 below, if a paging message is for triggering an RRC setup, it may be indicated in the paging message on the PDSCH. If a paging message is for a system information modification or a ETWS/CMAS notification, it may be indicated in the first bit or the second bit of a DCI Format 1_0 short message, respectively.

TABLE 2

Example of paging messages on non-sidelink communication.

| Paging Type | Identifier |
|---|---|
| Triggering RRC Setup | RRC paging message on PDSCH |
| System Information Modification | First bit of DCI Format 1_0 short message |
| ETWS/CMAS notification | Second bit of DCI Format 1_0 short message |

Figure 12:
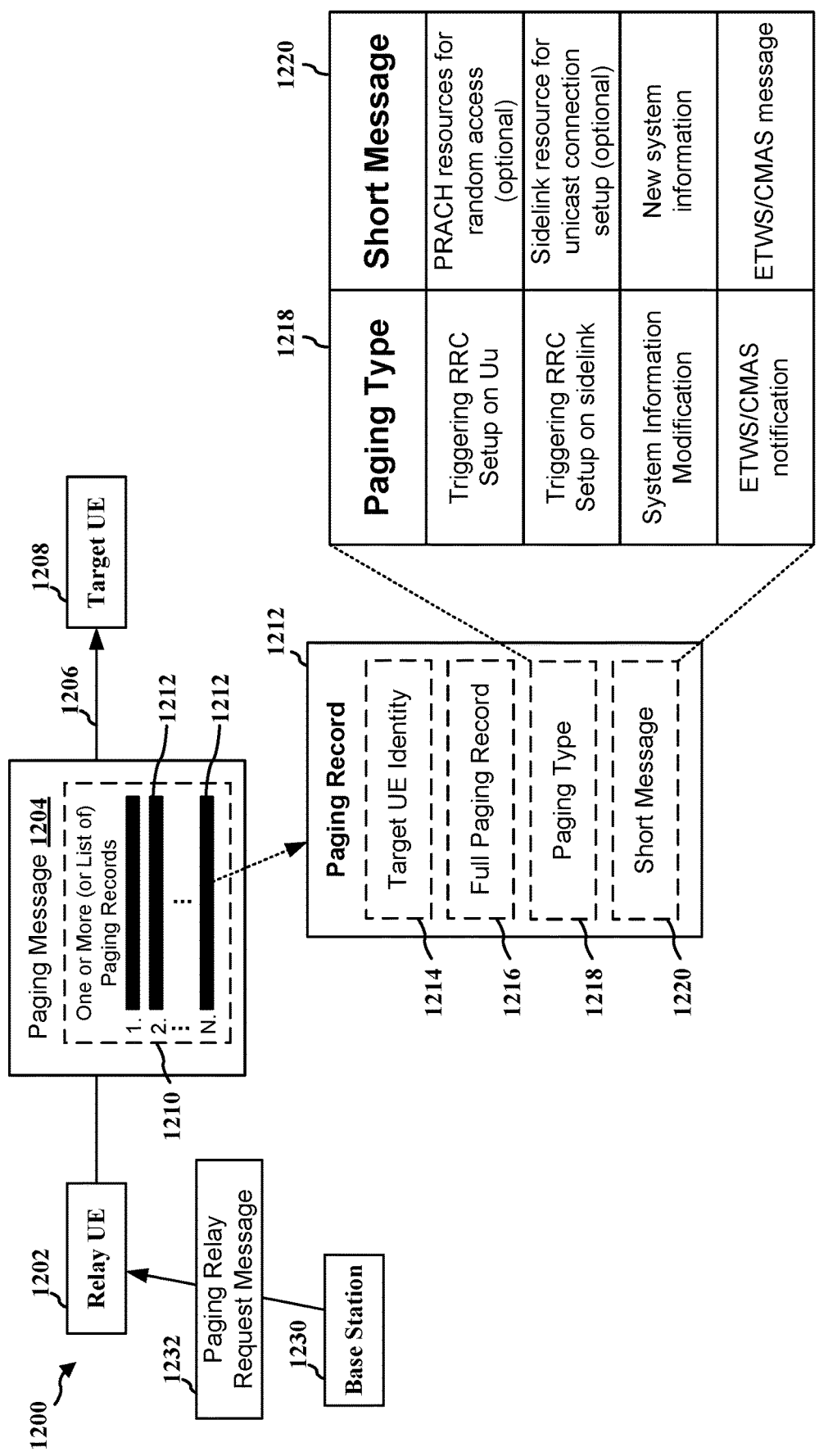
FIG. 12 is a diagram illustrating an example paging message from a relay UE to a target UE over a sidelink in accordance with various aspects of the present disclosure.

As a sidelink communication may not be using DCIs and/or PDSCHs, different types of the paging message may be transmitted to a target UE (e.g., the target UE 708) from a relay UE (e.g., the relay UE 702) over the sidelink (e.g., the sidelink 716). FIG. 12 is a diagram 1200 illustrating an example paging message transmitted from a relay UE to a target UE over the sidelink (e.g., via a PC5 interface) according to aspects of the present disclosure. In one aspect, after receiving one or more paging relay request messages 1232 from a base station 1230, a relay UE 1202 may send a paging message 1204 to a target UE 1208 over a sidelink 1206, where the paging message 1204 may include one or more paging records 1210 (e.g., paging history, paging-related information, information related to one or more past pagings, etc.), and each paging record 1212 within the one or more paging records 1210 may include one or more of: a target UE's UE-identity 1214, a full or partial paging record 1216 (e.g., paging history, list showing past pagings, etc.), a paging type 1218, and/or a short message 1220, etc. The paging record 1212 may include the target UE-identity 1214 if the relay UE 1202 has the target UE's UE-identity (e.g., target UE 1208) and that the relay UE 1202 also knows the paging from the base station 1230 (e.g., received in the paging relay request message 1232) is dedicated to the target UE. Thus, based on the target UE-identity 1214, the target UE 1208 receiving the paging message 1204 may identify whether there was a paging for the target UE 1208 (e.g., from the base station 1230) or how many times has the target UE 1208 being paged, etc. The relay UE 1202 may also specify or indicate this information to the target UE 1208, either in the paging message 1204 or in a separate message.

The paging message 1204 may include a subset of paging records from one or more paging relay request messages 1232 that are for the target UE 1208, e.g., if the relay UE 1202 knows the target UE identity. On the other hand, if the relay UE 1202 does not have the target UE's UE-identity or if the relay UE 1202 does not know whether the paging message in the received paging relay request message 1232 is dedicated to the target UE 1208, the paging record 1212 may include the full or partial paging record 1216 that lists one or more paging message(s) received by the relay UE 1202 from the base station on the Uu interface (e.g., from the base station 1230 in the paging relay request message 1232, etc.). Based on the full or partial paging record 1216, the target UE 1208 may be able to identify whether it has been paged or how many times it has been paged, such as by looking for its UE-identity or related information within the full or partial paging record 1216.

TABLE 3

Example of paging messages on sidelink communication.

| Paging type | Short message (may be additional) |
| --- | --- |
| Triggering RRC Setup on Uu | PRACH resources for random access |
| Triggering RRC Setup on sidelink | Sidelink resource for unicast connection setup |
| System Information Modification | New system information |
| ETWS/CMAS notification | ETWS/CMAS message |

As shown by FIG. 12 and Table 3 above, the paging type 1218 within the paging record 1212 may indicate the type or types of the paging from the base station, such as whether the paging is to trigger the RRC setup over the Uu interface, to trigger the RRC setup over sidelink, a system information modification, a ETWS/CMAS notification, and/or an emergency message/notification, etc. The short message 1220 within the paging record 1212 may include the message indicating the PRACH resources for random access and the message indicating the sidelink resource for unicast connection setup, such as described in connection with Table 1. In addition, the short message 1220 may include a new system information for the system information modification (e.g., update) if the paging type 1218 indicates that the paging from the base station (e.g., received from the base station 1230 in the paging relay request message 1232) is for the system information modification. Thus, after the target UE 1208 receives the paging message 1204, the target UE 1208 may be able to apply the new system information if the new system information is dedicated to the target UE 1208. Similarly, the short message 1220 may include the ETWS/CMAS message if the paging type 1218 indicates that the paging is for ETWS/CMAS notification. Thus, after the target UE receives the paging message 1204, the target UE 1208 may be able to obtain the message within the ETWS/CMAS notification if the ETWS/CMAS notification is dedicated to the target UE. By including the new system information and/or the ETWS/CMAS message in the paging record 1212 of the paging message 1204, the target UE 1208 may be able to obtain the new system information and/or the ETWS/CMAS message without reading the SIB from the base station.

Figure 13:
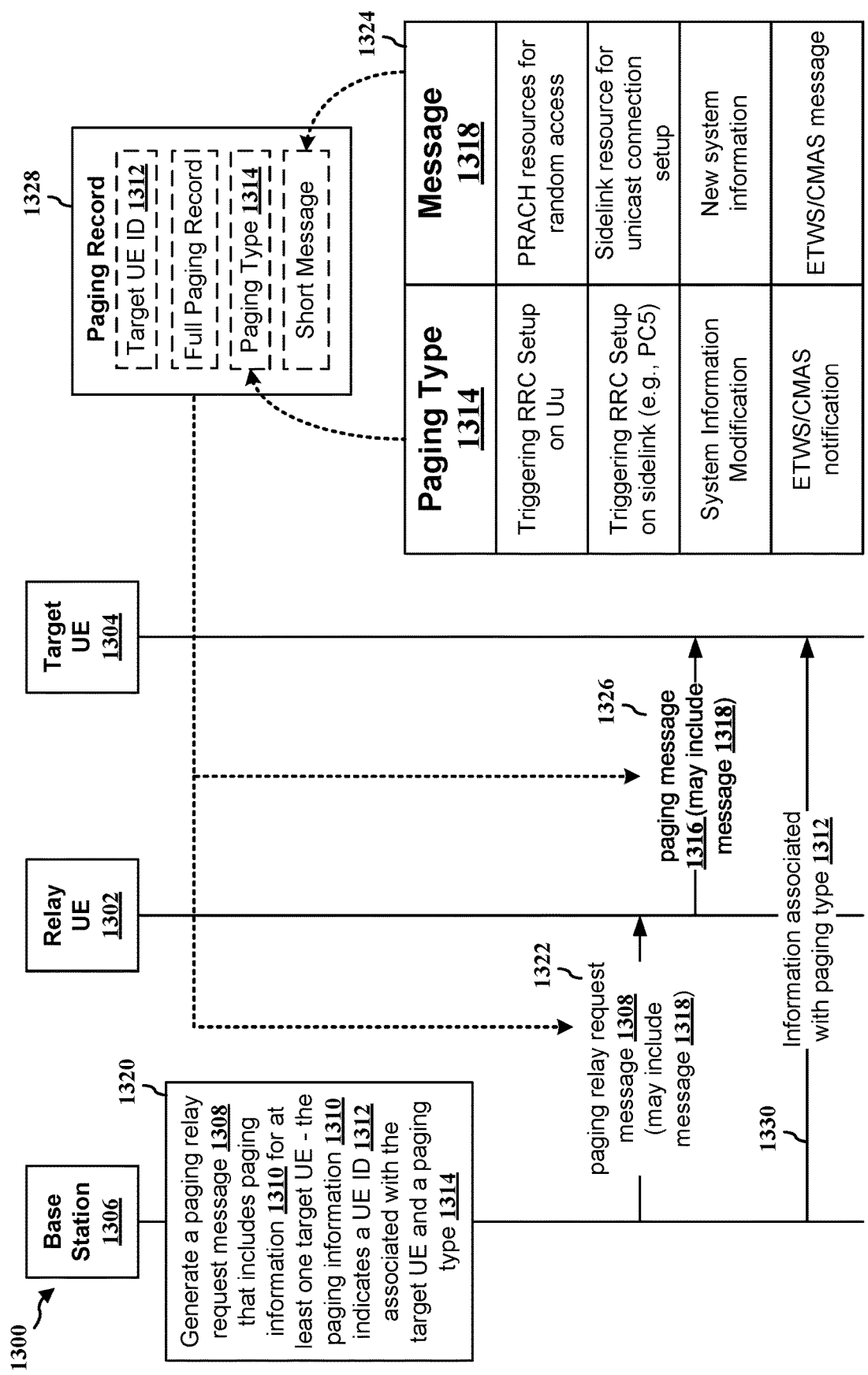
FIG. 13 is a communication flow illustrating an example of a base station transmitting a paging message or information to a target UE via a relay UE in accordance with various aspects of the present disclosure.

FIG. 13 is a communication flow 1300 illustrating an example of a base station transmitting a paging message or information to a target UE via a relay UE in accordance with various aspects of the present disclosure. The numberings associated with the communication flow 1300 do not specify a particular temporal order and are merely used as references for the communication flow 1300.

At 1320, a base station 1306 may generate a paging relay request message 1308 that includes paging information 1310 for at least one target UE, such as a target UE 1304. The paging information 1310 may indicate at least a UE ID 1312 associated with the at least one target UE (e.g., the target UE 1304) and a paging type 1314. In one example, the base station 1306 may determine to generate the paging relay request message 1308 based on a request received from a network (e.g., the AMF of the network). In another example, the base station 1306 may determine to generate the paging relay request message 1308 based on its own determination, e.g., the base station 1306 determines to trigger an RRC setup with the target UE 1304.

At 1322, the base station 1306 may transmit, to a relay UE 1302, the paging relay request message 1308, where the paging relay request message 1308 may indicate a request for the relay UE 1302 to relay paging information 1310 to the target UE 1304 over sidelink. The base station 1306 may transmit the paging relay request message 1308 on a PDSCH to the relay UE 1302. In some examples, the paging relay request message 1308 may include paging information 1310 for multiple UEs (e.g., multiple target UEs). In addition, the base station 1306 may indicate the paging type 1314 in the paging information 1310 which may be included in the paging relay request message 1308.

In one example, as shown at 1324 and as described in connection with FIG. 12, the paging type 1314 may indicate at least one of: a first page type triggering an RRC setup over a Uu interface, a second page type triggering the RRC setup over a sidelink interface (e.g., a PC5 interface), a third page type for a system information modification, a fourth page type for an ETWS notification, and/or a fifth page type for a CMAS notification, etc.

In another example, the base station 1306 may transmit/include one or more messages 1318 that are associated with the paging information 1310 for the relay UE 1302 in the paging relay request message 1302. For example, as shown at 1324, the one or more messages 1318 may include random access resources (e.g., PRACH resources) for the target UE 1304 to perform an RRC set up, a sidelink resource for the target UE 1304 to perform a unicast connection set up, a new system information, ETWS/CMAS related messages, and/or emergency related messages/indications, etc.

At 1326, the relay UE 1302 may transmit a paging message 1316 to the target UE 1304 over sidelink. The paging message 1316 may indicate the paging type 1314 and/or the one or more messages 1318 that are associated with the paging information 1310.

In some examples, as shown at 1328 and as discussed in connection with FIG. 12, the paging relay request message 1308 may include one or more paging records. As such, the relay UE 1302 may transmit a dedicated paging message to the target UE 1304 based on at least one paging record in the one or more paging records if the relay UE 1302 detects that the UE ID 1312 for the target UE 1304 is included in the one or more paging records. Additionally or alternatively, the relay UE 1302 may transmit the one or more paging records in the paging message 1316 to the target UE 1304 based on the relay UE 1302 not detecting the UE ID 1312 for the target UE 1304 in the one or more paging records.

At 1330, after receiving the paging message 1316 over sidelink from the relay UE 1302 (e.g., the paging message that includes the paging information 1310 indicating a paging type 1314 for a page from the base station 1306), the target UE 1304 may receive information from the base station 1306 based on the paging type 1314 indicated in the paging message 1316 from the relay UE 1302. For example, if the paging type 1314 indicates a system information modification, the target UE 1304 may receive new/updated system information from the base station 1306 at 1330. In another example, if the paging type 1314 indicates an RRC setup, the target UE 1304 may receive information/resources associated with the RRC setup from the base station 1306 at 1330, etc.

Figure 14:
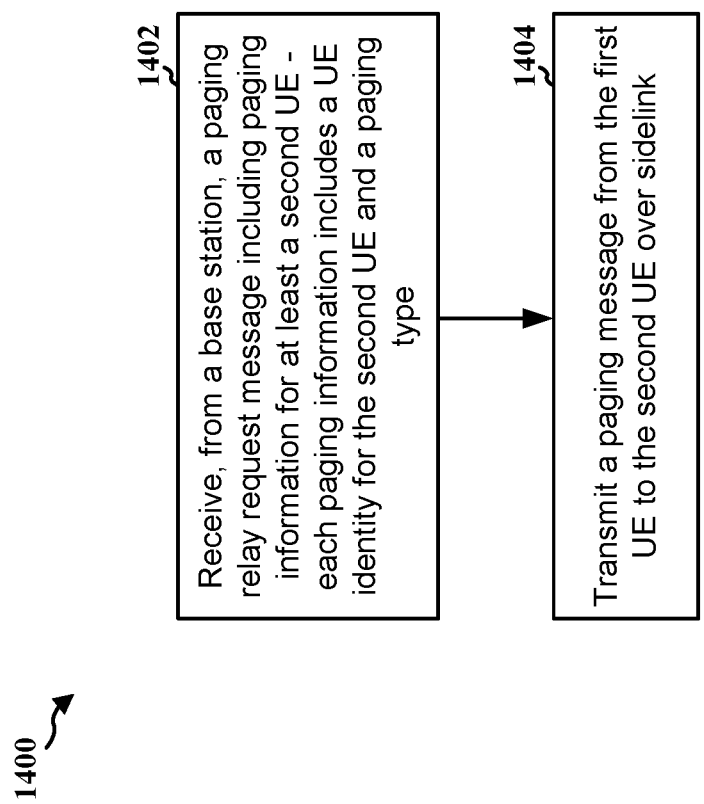
FIG. 14 is a flowchart of a method of wireless communication.

FIG. 14 is a flowchart 1400 of a method of wireless communication. In some examples, the method may be performed by a UE or a component of a UE (which may be referred to as a relay UE or a relay device) (e.g., the UE 104, 702; the RSU 107; the device 310 or 350; the relay UE 902, 1002, 1102, 1202, 1302; the apparatus 1502). The method may help to reduce latency in communication, improve reliability, and improve the efficient use of wireless resource through relaying a page from a base station to a second UE over sidelink.

At 1402, a first UE may receive, from a base station, a paging relay request message including paging information for at least a second UE, each paging information including a UE identity for the second UE and a paging type, such as described in connection with FIGS. 12 and 13. For example, at 1322, the relay UE 1302 may receive a paging relay request message 1308 from the base station 1306, where the paging relay request message 1308 may include a UE ID 1312 for the target UE 1304 and a paging type 1314. The reception of the paging relay request message may be performed by, e.g., the paging relay request message component 1540 and/or the reception component 1530 of the apparatus 1502 in FIG. 15. The first UE receives the paging relay request message on a PDSCH from the base station.

In one example, the paging relay request message may include the paging information for multiple UEs.

In another example, the first UE may indicate the paging type in the paging message that the first UE transmits to the second UE over the sidelink. The paging type may indicate at least one of: a first type of page triggering an RRC setup over a Uu interface, or a second type of page triggering the RRC setup over a sidelink (e.g., PC5) interface, a third type of page for a system information modification, a fourth type of page for an ETWS notification, a fifth type of page for a CMAS notification, or a sixth page type for an emergency message or an emergency notification, such as described in connection with Table 1 and FIGS. 12 and 13.

In another example, the first UE may receive the paging information in the paging relay request message including a message associated with the paging information for the second UE. For example, the message associated with the paging information may include at least one of: random access resources for the second UE to perform RRC set up, or a sidelink resource for the second UE to perform a unicast connection set up.

At 1404, the first UE may transmit a paging message from the first UE to the second UE over sidelink, such as described in connection with FIGS. 12 and 13. For example, at 1326, the relay UE 1302 may transmit a paging message 1316 to the target UE 1304 over sidelink. The transmission of the paging message may be performed by, e.g., the paging message configuration component 1542 and/or the transmission component 1534 of the apparatus 1502 in FIG. 15.

In one example, the first UE may indicate a paging type in the paging message that the first UE transmits to the second UE over the sidelink. In such an example, the paging type may indicate at least one of: a first type of page triggering an RRC setup over a Uu interface, or a second type of page triggering the RRC setup over a sidelink interface, a third type of page for a system information modification, a fourth type of page for an ETWS notification, a fifth type of page for a CMAS notification, or a sixth page type for an emergency message or an emergency notification, such as described in connection with FIGS. 12 and 13.

In another example, the paging relay request message may include one or more paging records (e.g., 1210), each paging record (e.g., 1212) may include a UE identity (e.g., 1215) for a UE to which the page is directed and the paging type (e.g., 1218), such as described in connection with FIG. 12. In one example, the first UE may transmit a dedicated paging message to the second UE based on at least one paging record in the one or more paging records in response to the first UE detecting the UE identity for the second UE is included in the one or more paging records. Then the first UE may transmit the one or more paging records in the paging message to the second UE based on the first UE not detecting the UE identity for the second UE in the one or more paging records. In other examples, the first UE may transmit an additional message in the paging message to the second UE, where the additional message may include at least one of: random access resources for the second UE to perform RRC set up, or a sidelink resource for the second UE to perform a unicast connection set up, such as described in connection with Table 1.

Figure 15:
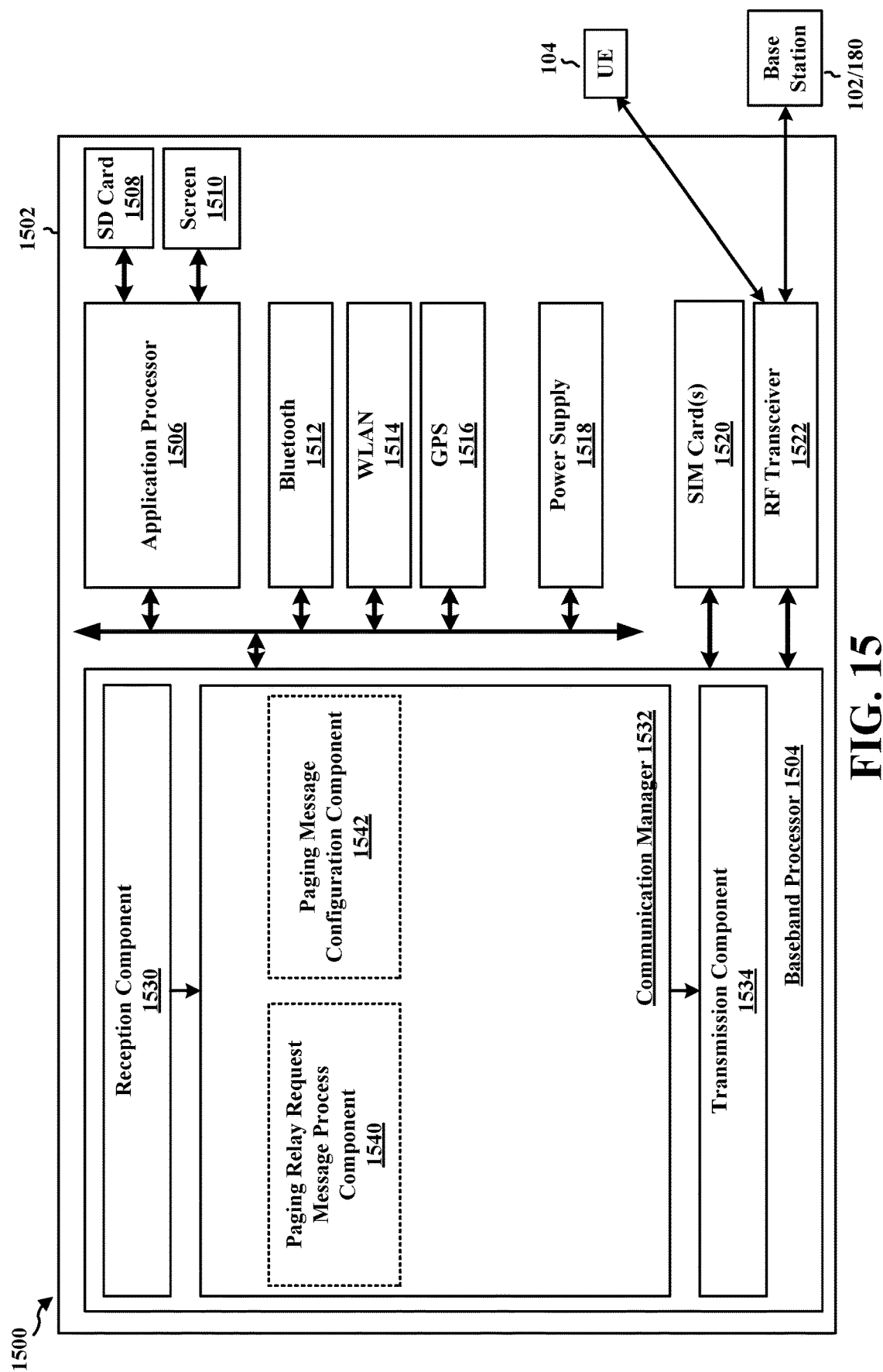
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a baseband processor 1504 (also referred to as a modem) coupled to a RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE (e.g., of the device 350) and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a paging relay request message component 1540 that is configured to receive, from a base station, a paging relay request message including paging information for at least a second UE, each paging information including a UE identity for the second UE and a paging type, e.g., as described in connection with 1402 in FIG. 14. The communication manager 1532 further includes a paging message configuration component 1542 that is configured to transmit a paging message from the first UE to the second UE over sidelink, e.g., as described in connection with 1404 in FIG. 14.

The apparatus may include additional components that perform each of the blocks of the algorithm in the flowchart of FIG. 14 or any of the aspects performed by the relay UE 1202 in FIG. 12. As such, each block in the flowchart of FIG. 14 or any of the aspects performed by the relay UE 1202 in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving, from a base station, a paging relay request message including paging information for at least a second UE, each paging information including a UE identity for the second UE and a paging type (e.g., the paging relay request message component 1540 and/or the reception component 1530). The apparatus 1502 includes means for transmitting a paging message from the first UE to the second UE over sidelink (e.g., the paging message configuration component 1542 and/or the transmission component 1534).

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
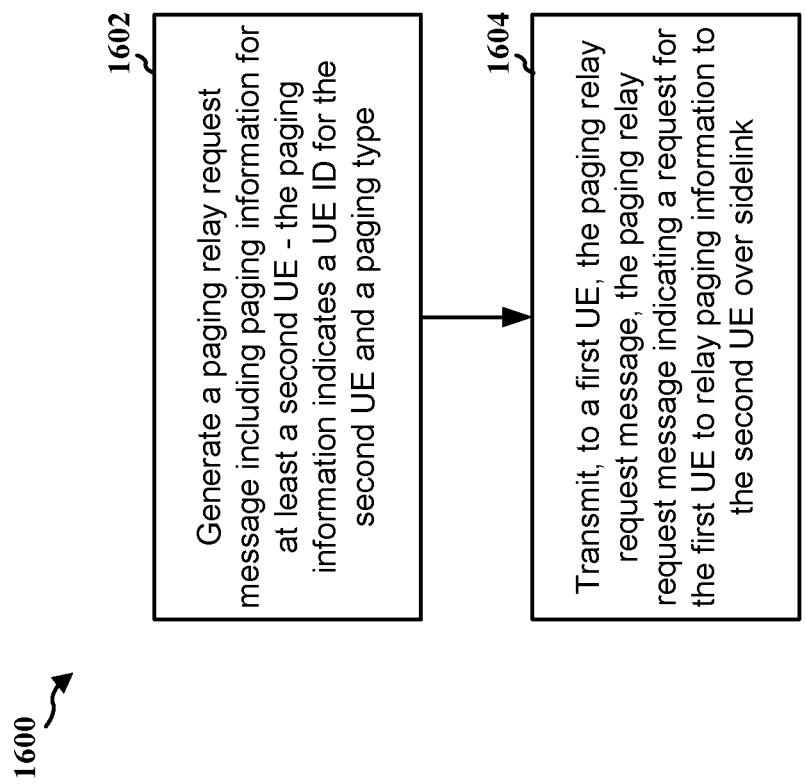
FIG. 16 is a flowchart of a method of wireless communication.

FIG. 16 is a flowchart 1600 of a method of wireless communication. In some examples, the method may be performed by a base station or a component of a base station (e.g., the base station 102, 180, 710, 1230, 1306; the apparatus 1702). The method may help to reduce latency in communication, improve reliability, and improve the efficient use of wireless resource through relaying a page from a base station to a target UE over sidelink.

At 1602, the base station may generate a paging relay request message including paging information for at least a second UE, the paging information may indicate a UE ID for the second UE and a paging type, such as described in connection with FIG. 13. For example, at 1320, the base station 1306 may generate a paging relay request message 1308 that includes paging information 1310 for at least one target UE, where the paging information 1310 may indicate a UE ID 1312 associated with the target UE and a paging type 1314. The generation of the paging relay request message may be performed by, e.g., the paging relay request message generation component 1740 of the apparatus 1702 in FIG. 17.

At 1604, the base station may transmit, to a first UE, the paging relay request message, the paging relay request message indicating a request for the first UE to relay paging information to the second UE over sidelink, such as described in connection with FIGS. 12 and 13. For example, at 1322, the base station 1306 may transmit the paging relay request message 1308 to the relay UE 1302, where the paging relay request message 1322 may indicate a request for the relay UE 1302 to relay paging information to the target UE 1304 over sidelink. The generation of the paging relay request message may be performed by, e.g., the paging relay request message configuration component 1742 and/or the transmission component 1734 of the apparatus 1702 in FIG. 17. The base station may transmit the paging relay request message on a PDSCH to the first UE. The paging relay request message may include the paging information for multiple UEs In one example, the base station may indicate a paging type in the paging information included in the paging relay request message. For example, the paging type indicates at least one of: a first page type triggering an RRC setup over a Uu interface, or a second page type triggering the RRC setup over a sidelink (e.g., PC5) interface, a third page type for a system information modification, a fourth page type for an ETWS notification, a fifth page type for a CMAS notification, or a sixth page type for an emergency message or an emergency notification, such as described in connection with FIGS. 12 and 13.

In another example, the base station transmits a message associated with the paging information for the first UE in the paging relay request message, where the message associated with the paging information may include at least one of: random access resources for the second UE to perform RRC set up, or a sidelink resource for the second UE to perform a unicast connection set up, such as described in connection with FIGS. 12 and 13 and Table 1.

Figure 17:
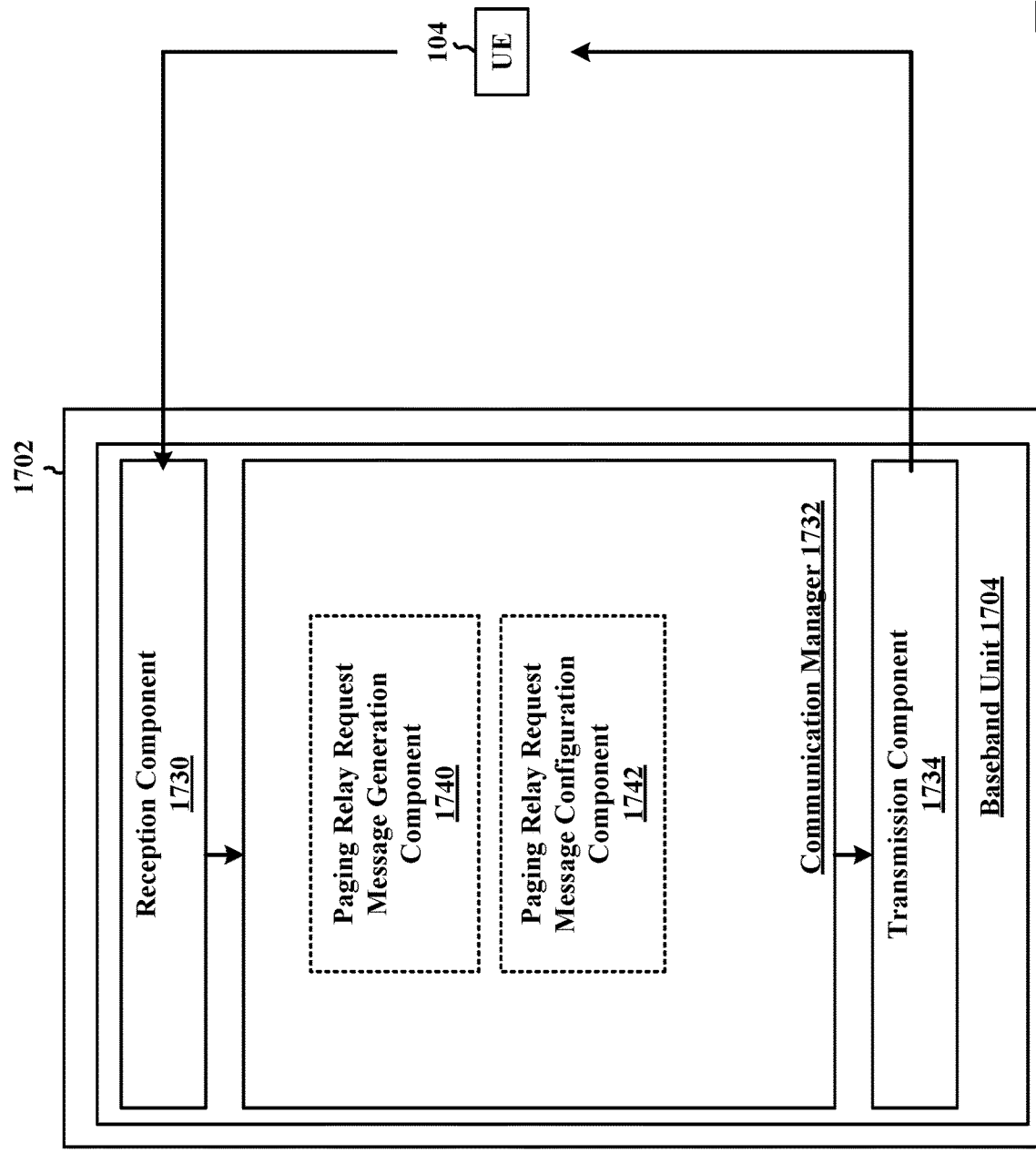
FIG. 17 is a diagram illustrating an example of a hardware implementation for an example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the device 310 and may include the memory 376 and/or at least one of the TX processor 316, the RX processor 370, and the controller/processor 375.

The communication manager 1732 includes a paging relay request message generation component 1740 that is configure to generate a paging relay request message including paging information for at least a second UE, the paging information indicating a UE ID for the second UE and a paging type, e.g., as described in connection with 1602 in FIG. 16. The communication manager 1732 further includes a paging relay request message configuration component 1742 that is configured to transmit, to a first UE, the paging relay request message, the paging relay request message indicating a request for the first UE to relay paging information to the second UE over sidelink, e.g., as described in connection with 1604 in FIG. 16.

The apparatus may include additional components that perform each of the blocks of the algorithm in the flowchart of FIG. 16 of any of the aspects performed by the base station 710, 1230, 1306 in FIGS. 7, 12, and 13. As such, each block in the flowchart of FIG. 16 of any of the aspects performed by the base station 710, 1230, 1306 in FIGS. 7, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for generating a paging relay request message including paging information for at least a second UE, the paging information indicating a UE ID for the second UE and a paging type (e.g., the paging relay request message generation component 1740). The apparatus 1702 includes means for transmitting, to a first UE, the paging relay request message, the paging relay request message indicating a request for the first UE to relay paging information to the second UE over sidelink (e.g., the paging relay request message configuration component 1742 and/or the transmission component 1734).

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 18:
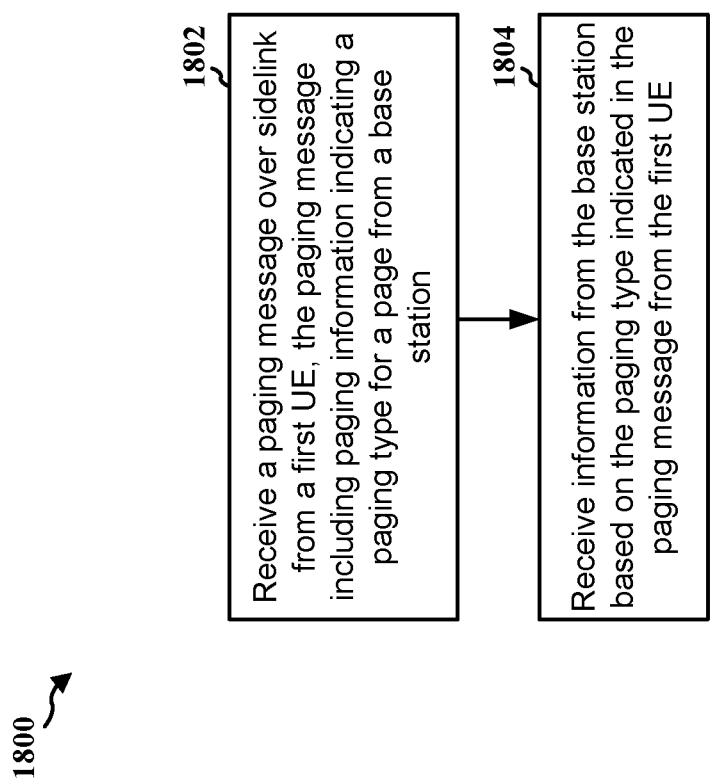
FIG. 18 is a flowchart of a method of wireless communication.

FIG. 18 is a flowchart 1800 of a method of wireless communication. In some examples, the method may be performed by a UE or a component of a UE (which may be referred to as a target) (e.g., the target UE 1208, 1208; the apparatus 1902). The method may help to reduce latency in communication, improve reliability, and improve the efficient use of wireless resource through relaying a page from a base station to the second UE over sidelink.

At 1802, a second UE may receive a paging message over sidelink from a first UE, the paging message including paging information indicating a paging type for a page from a base station, such as described in connection with FIGS. 12 and 13. For example, at 1326, the target UE 1304 may receive the paging message 1316 from the relay UE 1302, where the paging message 1316 may include paging information 1310 and the paging type 1314. The reception of the paging message may be performed by, e.g., the paging message process component 1940 and/or the reception component 1930 of the apparatus 1902 in FIG. 19.

In one example, the paging type may indicate at least one of: a first page type triggering an RRC setup over a Uu interface, or a second page type triggering the RRC setup over a sidelink interface, a third page type for a system information modification, a fourth page type for an ETWS notification, a fifth page type for a CMAS notification, or a sixth page type for an emergency message or an emergency notification.

At 1804, the second UE may receive information from the base station based on the paging type indicated in the paging message from the first UE, such as described in connection with FIGS. 12 and 13. For example, at 1330, the target UE 1304 may receive additional information associated with paging type 1314 from the base station 1306. The reception of the information may be performed by, e.g., the paging information process component 1942 and/or the reception component 1930 of the apparatus 1902 in FIG. 19.

In one example, the second UE may receive an additional message in the paging message from the first UE, where the additional message may include at least one of: random access resources for the second UE to perform RRC set up, or a sidelink resource for the second UE to perform a unicast connection set up, such as described in connection with FIG. 12 and Table 1.

Figure 19:
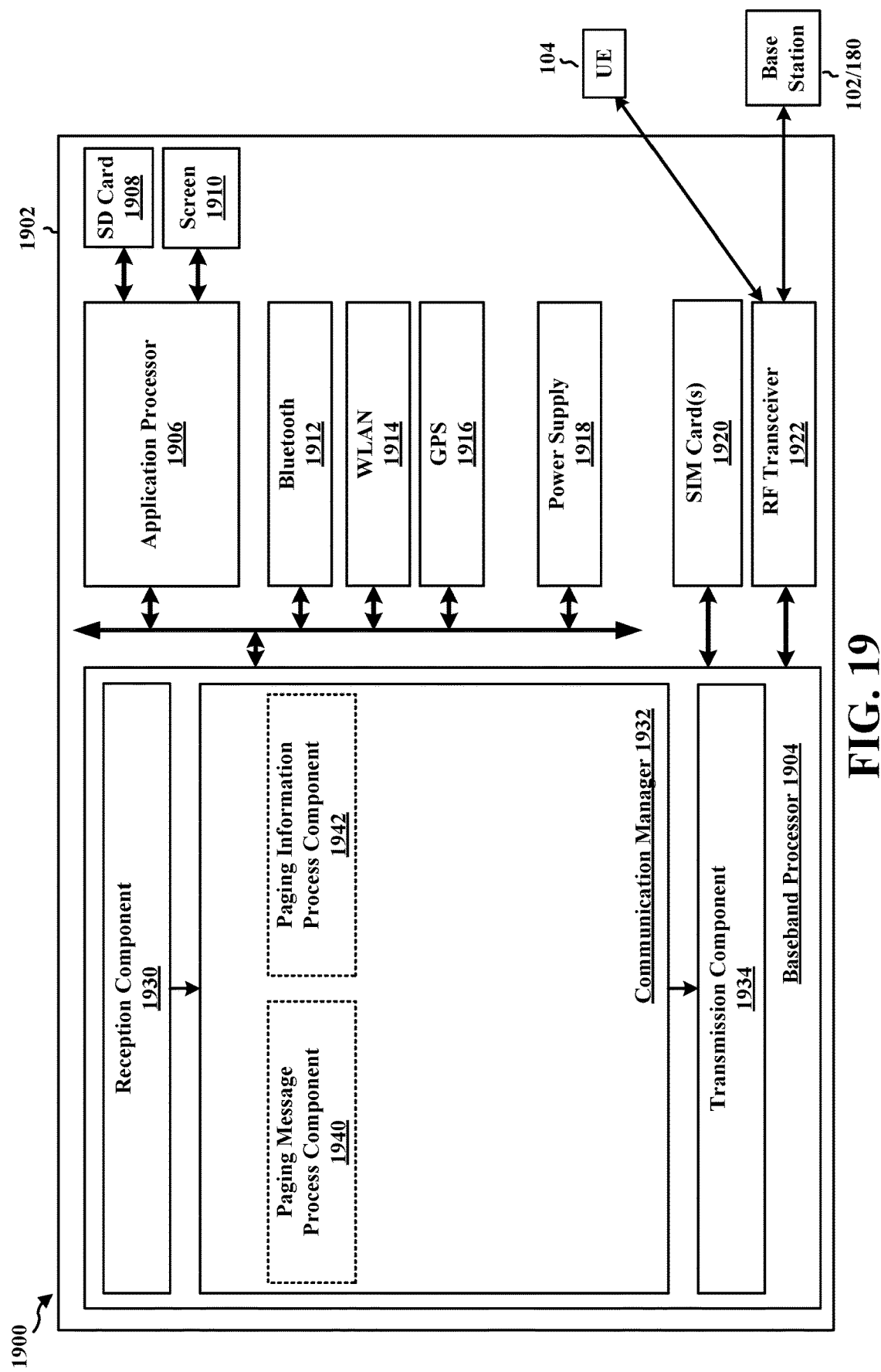
FIG. 19 is a diagram illustrating an example of a hardware implementation for an example apparatus.

FIG. 19 is a diagram 1900 illustrating an example of a hardware implementation for an apparatus 1902. The apparatus 1902 may be a UE, a component of a UE, or may implement UE functionality. In some aspects, the apparatus 1902 may include a baseband processor 1904 (also referred to as a modem) coupled to a RF transceiver 1922. In some aspects, the apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, or a power supply 1918. The baseband processor 1904 communicates through the RF transceiver 1922 with the UE 104 and/or BS 102/180. The baseband processor 1904 may include a computer-readable medium/memory. The computer-readable medium/memory may be non-transitory. The baseband processor 1904 is responsible for general processing, including the execution of software stored on the computer-readable medium/memory. The software, when executed by the baseband processor 1904, causes the baseband processor 1904 to perform the various functions described supra. The computer-readable medium/memory may also be used for storing data that is manipulated by the baseband processor 1904 when executing software. The baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband processor 1904. The baseband processor 1904 may be a component of the UE (e.g., of the device 350) and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the additional modules of the apparatus 1902.

The communication manager 1932 includes a paging message process component 1940 that is configured to receive a paging message over sidelink from a first UE, the paging message including paging information indicating a paging type for a page from a base station, e.g., as described in connection with 1802 in FIG. 18. The communication manager 1932 further includes a paging information process component 1942 that is configured to receive information from the base station based on the paging type indicated in the paging message from the first UE, e.g., as described in connection with 1804 in FIG. 18.

The apparatus may include additional components that perform each of the blocks of the algorithm in the flowchart of FIG. 18 or any of the aspects performed by the target UE 1208, 1304 in FIGS. 12 and 13. As such, each block in the flowchart of FIG. 18 or any of the aspects performed by the target UE 1208, 1304 in FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband processor 1804, includes means for receiving a paging message over sidelink from a first UE, the paging message including paging information indicating a paging type for a page from a base station (e.g., the paging message process component 1940 and/or the reception component 1930). The apparatus 1802 includes means for receiving information from the base station based on the paging type indicated in the paging message from the first UE (e.g., the paging information process component 1942 and/or the reception component 1930).

The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 20:
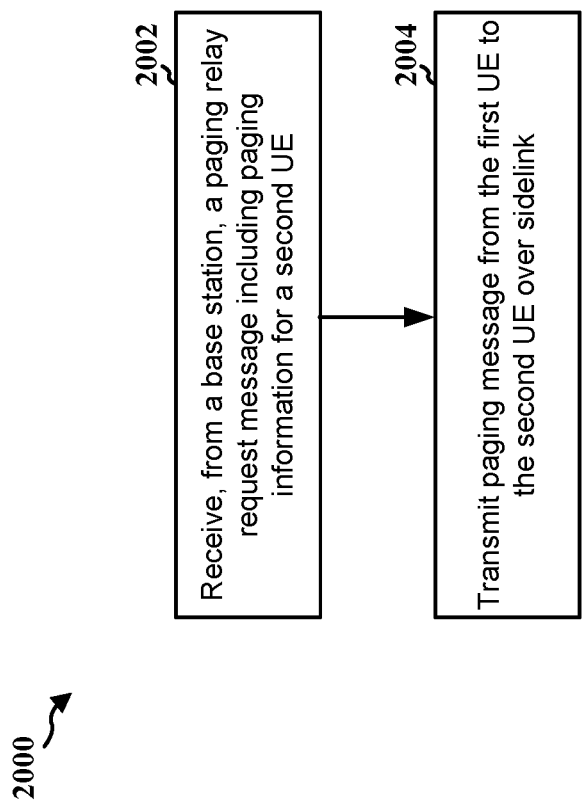
FIG. 20 is a flowchart of a method of wireless communication.

FIG. 20 is a flowchart 2000 of a method of wireless communication. In some examples, the method may be performed by a first UE (which may be referred to as a relay UE or a relay device) (e.g., the UE 104, the RSU 107, the device 310 or 350, the UE 702, the relay UE 902, 1002, 1102, or 1202; the apparatus 2102). The method may help to reduce latency in communication, improve reliability, and improve the efficient use of wireless resource through relaying a page from a base station to a second UE over sidelink.

At 2002, the first UE may receive, from a base station, a paging relay request message including paging information for a second UE, such as described in connection with FIG. 12. For example, the relay UE 1202 may receive a paging relay request message 1232 form the base station 1230. The first UE receives the paging relay request message on a PDSCH from the base station.

In one configuration, the first UE may receive the paging information in the paging relay request message including a paging type. In such configuration, the paging type may indicate at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification, such as described in connection with Table 1.

In another configuration, the first UE may receive the paging information in the paging relay request message including a message associated with the paging information for the second UE. In such configuration, the message associated with the paging information may include at least one of: random access resources for the second UE to perform RRC set up, or a sidelink resource for the second UE to perform a unicast connection set up.

At 2004, the first UE may transmit a paging message (e.g., 1204) from the first UE to the second UE over sidelink, such as described in connection with FIG. 12. For example, the relay UE 1202 may transmit a paging message 1204 to the target UE 1208 over the sidelink 1206.

In one configuration, the first UE may indicate a paging type in the paging message that the first UE transmits to the second UE over the sidelink. In such configuration, the paging type may indicate at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification, such as described in connection with FIG. 12.

In another configuration, the paging relay request message may include one or more paging records (e.g., 1210), each paging record (e.g., 1212) may comprise a UE identity (e.g., 1214) for a UE to which the page is directed and the paging type (e.g., 1218), such as described in connection with FIG. 12. In such configuration, the first UE may transmit a dedicated paging message to the second UE based on at least one paging record in the one or more paging records if first UE detects the UE identity for the second UE is comprised in the one or more paging records. Then the first UE may transmit the one or more paging records in the paging message to the second UE if first UE does not detect the UE identity for the second UE in the one or more paging records. In such configuration, the first UE may transmit an additional message in the paging message to the second UE, where the additional message may include at least one of: random access resources for the second UE to perform RRC set up, or a sidelink resource for the second UE to perform a unicast connection set up, such as described in connection with Table 1.

Figure 21:
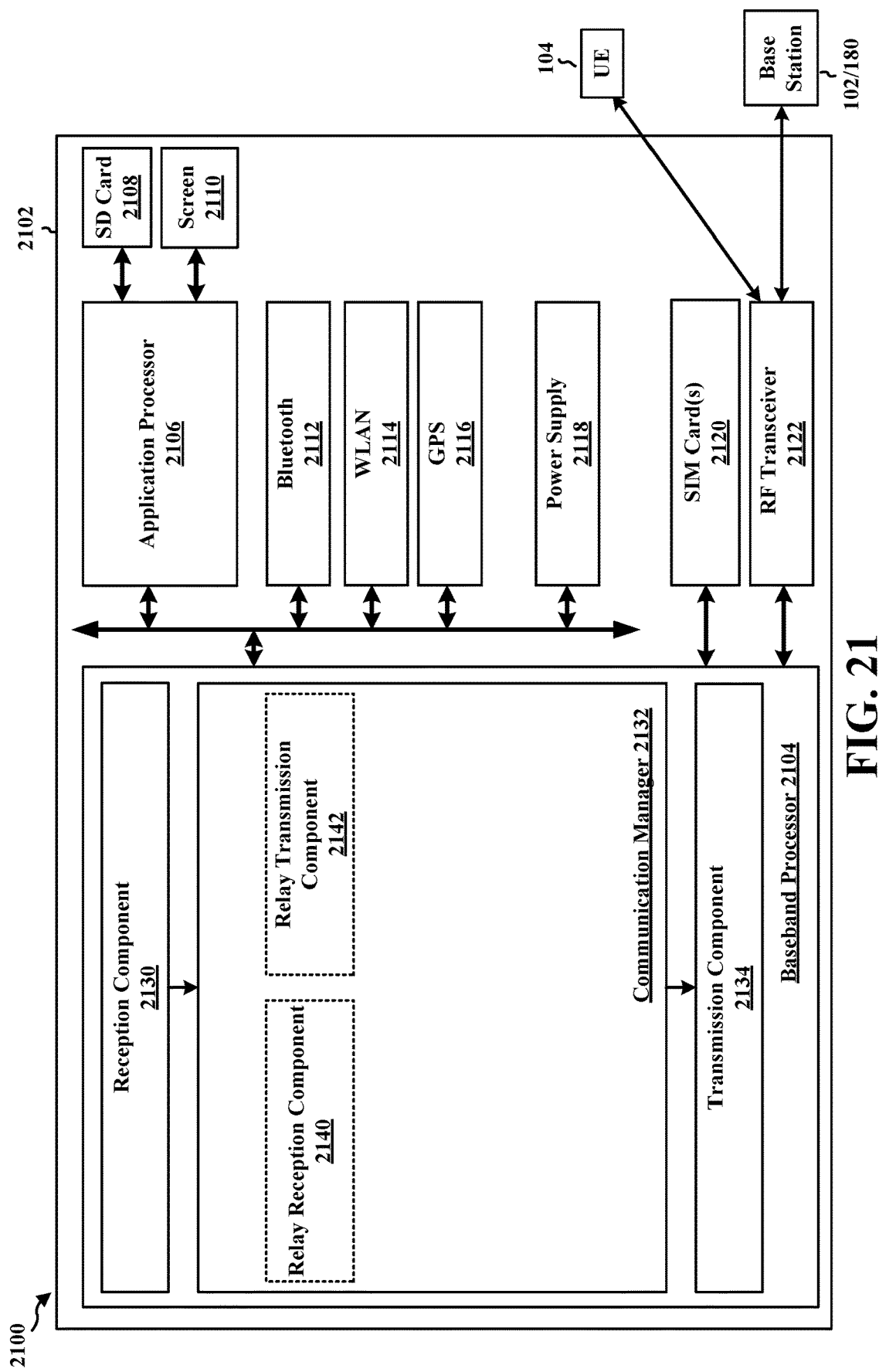
FIG. 21 is a diagram illustrating an example of a hardware implementation for an example apparatus.

FIG. 21 is a diagram 2100 illustrating an example of a hardware implementation for an apparatus 2102. The apparatus 2102 may be a UE or other wireless device that communicates based on sidelink. The apparatus 2102 includes a baseband processor 2104 (also referred to as a modem) coupled to an RF transceiver 2122 and one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, and a power supply 2118. The baseband processor 2104 communicates through the RF transceiver 2122 with the UE 104 and/or BS 102/180. The baseband processor 2104 may include a computer-readable medium/memory. The computer-readable medium/memory may be non-transitory. The baseband processor 2104 is responsible for general processing, including the execution of software stored on the computer-readable medium/memory. The software, when executed by the baseband processor 2104, causes the baseband processor 2104 to perform the various functions described supra. The computer-readable medium/memory may also be used for storing data that is manipulated by the baseband processor 2104 when executing software. The baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband processor 2104. The baseband processor 2104 may be a component of the device 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the additional modules of the apparatus 2102.

The communication manager 2132 includes a relay reception component 2140 that is configured to receive, from a base station, a paging relay request message including paging information for a second UE, e.g., as described in connection with 2002 in FIG. 20. The communication manager 2132 further includes a relay transmission component 2142 that is configured to transmit a paging message from the first UE to the second UE over sidelink, e.g., as described in connection with 2004 in FIG. 20.

The apparatus may include additional components that perform each of the blocks of the algorithm in the aforementioned flowchart of FIG. 20 or any of the aspects performed by the relay UE 1202 in FIG. 12. As such, each block in the aforementioned flowchart of FIG. 20 or any of the aspects performed by the relay UE 1202 in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2402, and in particular the cellular baseband processor 2404, includes means for receiving, from a base station, a paging relay request message including paging information for a second UE (e.g., relay reception component 2140, reception component 2130, and/or RF transceiver 2122). The apparatus 2402 includes means for transmitting a paging message from the first UE to the second UE over sidelink (e.g., relay transmission component 2142, transmission component 2134, and/or RF transceiver 2122). The aforementioned means may be one or more of the aforementioned components of the apparatus 2102 configured to perform the functions recited by the aforementioned means. As described supra, the apparatus 2102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 22:
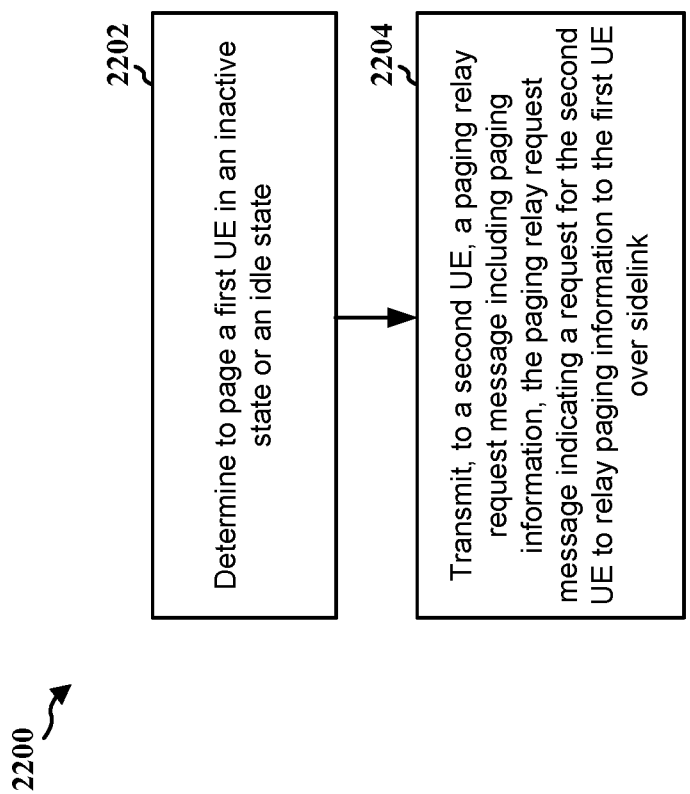
FIG. 22 is a flowchart of a method of wireless communication.

FIG. 22 is a flowchart 2200 of a method of wireless communication. In some examples, the method may be performed by a base station (e.g., the base station 102, 180, 710, 1230; the apparatus 2302). The method may help to reduce latency in communication, improve reliability, and improve the efficient use of wireless resource through relaying a page from a base station to a target UE over sidelink.

At 2202, the base station may determine to page a first UE in an inactive state or an idle state, such as described in connection with FIG. 6.

At 2204, the base station may transmit, to a second UE, a paging relay request message including paging information, the paging relay request message indicating a request for the second UE to relay paging information to the first UE over sidelink, such as described in connection with FIG. 12. The base station may transmit the paging relay request message on a PDSCH to the second UE.

In one configuration, the base station may indicate a paging type in the paging information comprised in the paging relay request message. In such configuration, the paging type indicates at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification, such as described in connection with FIG. 12.

In another configuration, the base station transmits a message associated with the paging information for the second UE in the paging relay request message, where the message associated with the paging information may include at least one of: random access resources for the first UE to perform RRC set up, or a sidelink resource for the first UE to perform a unicast connection set up, such as described in connection with FIG. 12 and Table 1.

Figure 23:
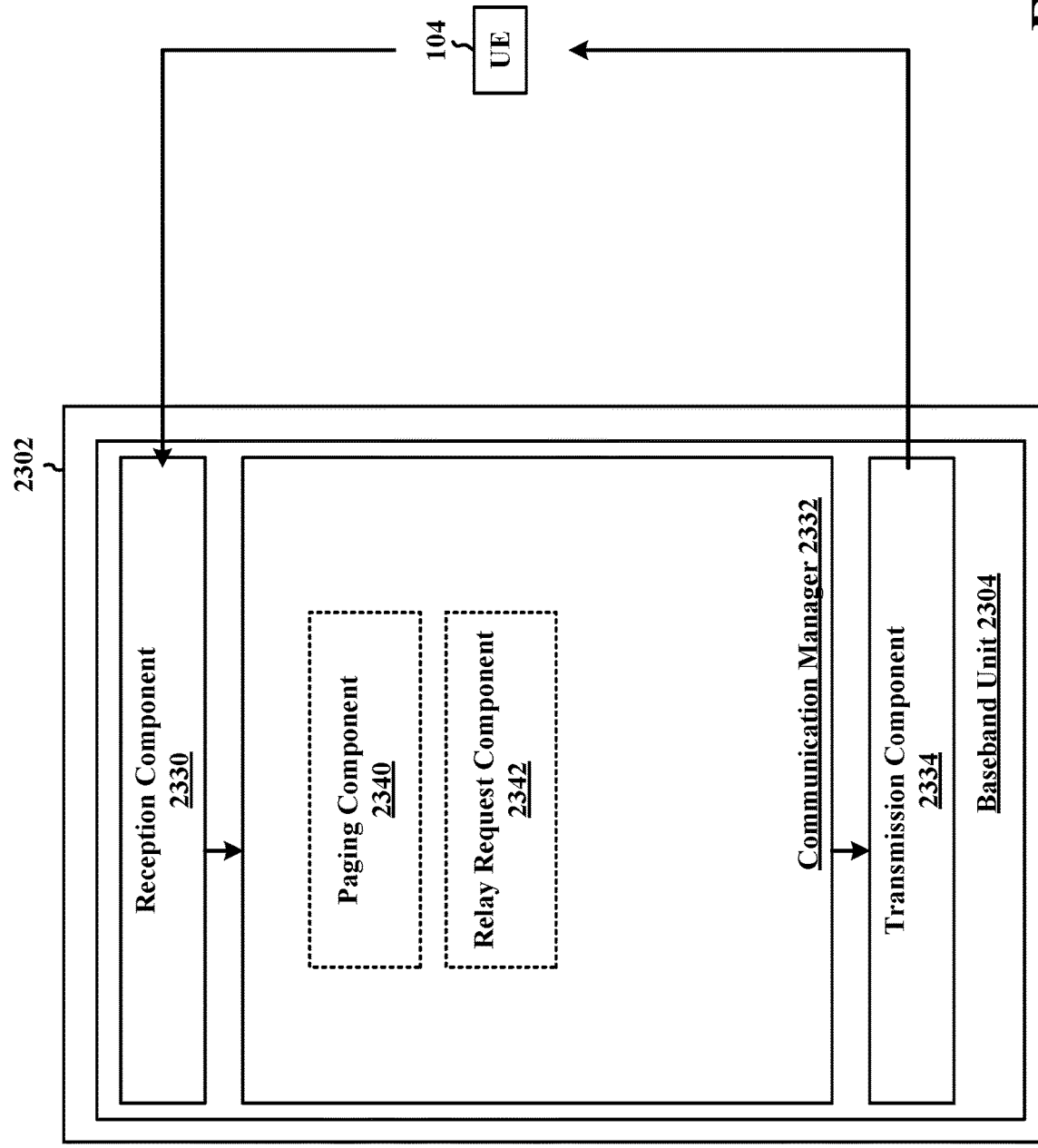
FIG. 23 is a diagram illustrating an example of a hardware implementation for an example apparatus.

FIG. 23 is a diagram 2300 illustrating an example of a hardware implementation for an apparatus 2302. The apparatus 2302 is a BS and includes a baseband unit 2304. The baseband unit 2304 may communicate through a cellular RF transceiver with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the device 310 and may include the memory 376 and/or at least one of the TX processor 316, the RX processor 370, and the controller/processor 375.

The communication manager 2332 includes a paging component 2340 that is configure to determine to page a first UE in an inactive state or an idle state, e.g., as described in connection with 2202 in FIG. 22. The communication manager 2332 further includes a target UE component 2342 that is configured transmit, to a second UE, a paging relay request message including paging information, the paging relay request message indicating a request for the second UE to relay paging information to the first UE over sidelink, e.g., as described in connection with 2204 in FIG. 22.

The apparatus may include additional components that perform each of the blocks of the algorithm in the aforementioned flowchart of FIG. 22 of any of the aspects performed by the base station 710, 1230 in FIGS. 7 and 12. As such, each block in the aforementioned flowchart of FIG. 22 of any of the aspects performed by the base station 710, 1230 in FIGS. 7 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2302, and in particular the baseband unit 2304, includes means for determining to page a first UE in an inactive state or an idle state (e.g., paging component 2340 of the communication manager 2332). The apparatus 2302 includes means for transmitting, to a second UE, a paging relay request message including paging information, the paging relay request message indicating a request for the second UE to relay paging information to the first UE over sidelink (e.g., relay request component 2342 of the communication manager 2332 and/or the transmission component 2334 of the base band unit 2304). The aforementioned means may be one or more of the aforementioned components of the apparatus 2302 configured to perform the functions recited by the aforementioned means. As described supra, the apparatus 2302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 24:
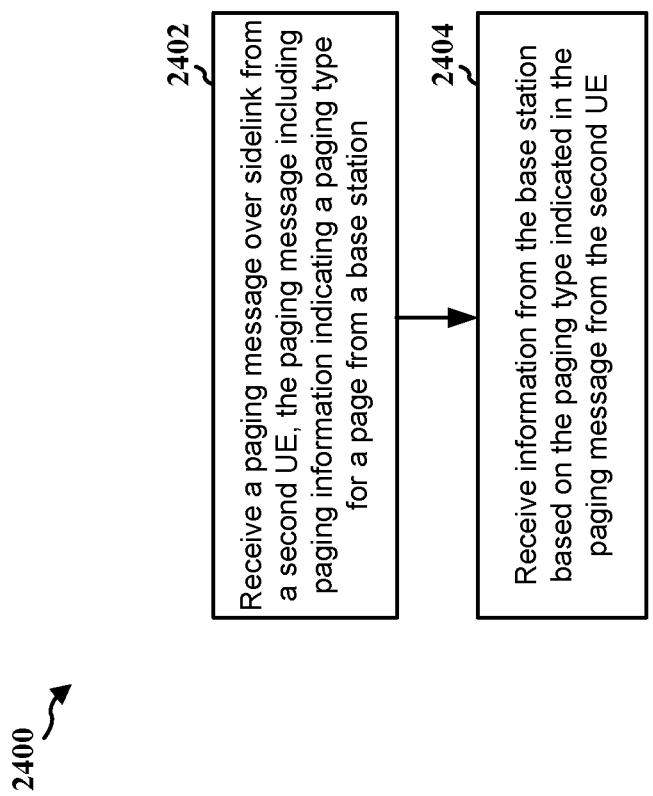
FIG. 24 is a flowchart of a method of wireless communication.

FIG. 24 is a flowchart 2400 of a method of wireless communication. In some examples, the method may be performed by a first UE (which may be referred to as a target) (e.g., the target UE 1208; the apparatus 2502). The method may help to reduce latency in communication, improve reliability, and improve the efficient use of wireless resource through relaying a page from a base station to the first UE over sidelink.

At 2402, the first UE may receive a paging message over sidelink from a second UE (e.g., relay UE 1202), the paging message including paging information indicating a paging type for a page from a base station (e.g., base station 1230), such as described in connection with FIG. 12. For example, the paging type may indicate at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification.

At 2404, the first UE may receive information from the base station based on the paging type indicated in the paging message from the second UE, such as described in connection with FIG. 12. For example, the first UE may receive an additional message in the paging message from the second UE, where the additional message includes at least one of: random access resources for the first UE to perform RRC set up, or a sidelink resource for the first UE to perform a unicast connection set up, such as described in connection with FIG. 12 and Table 1.

Figure 25:
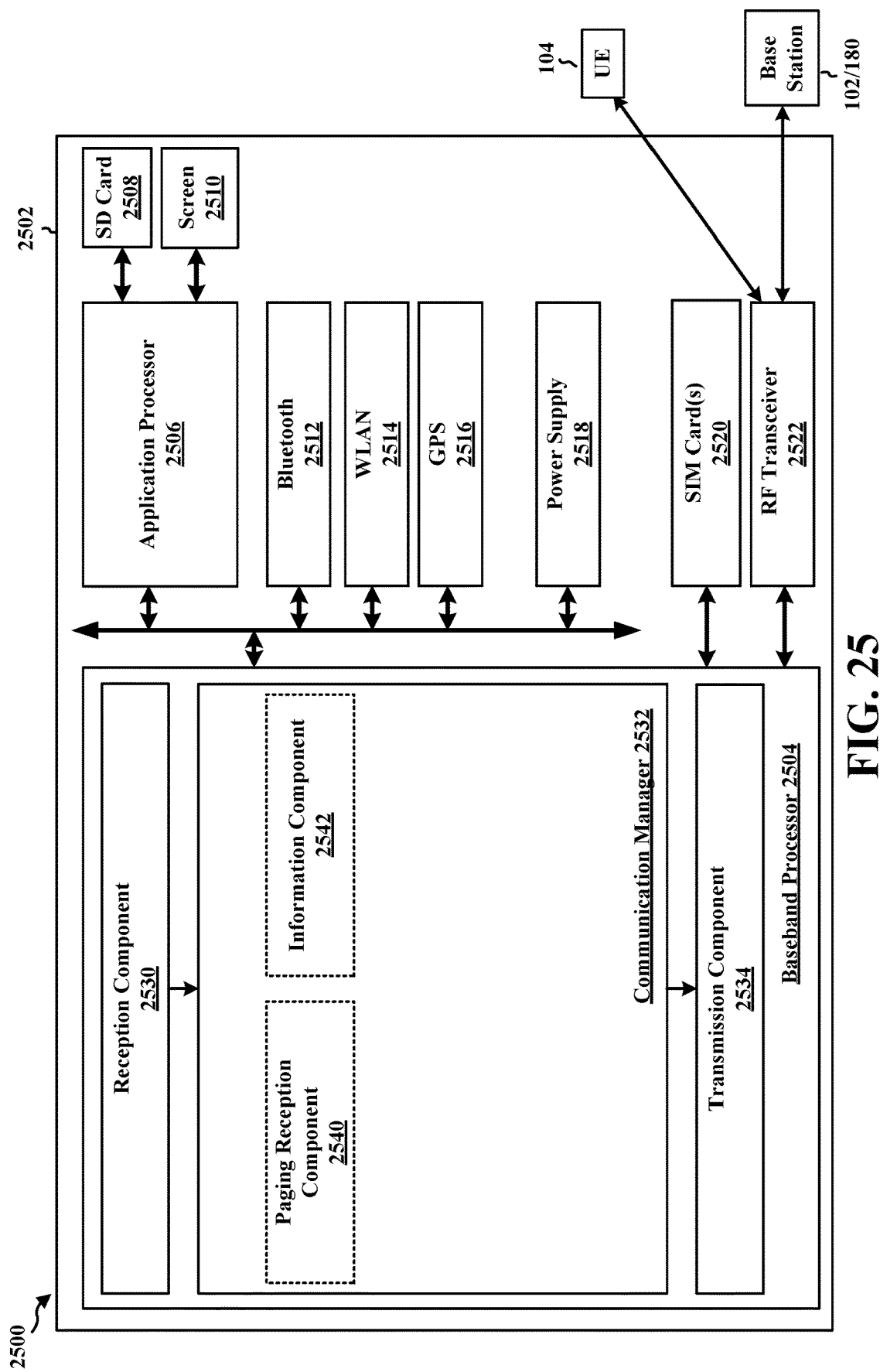
FIG. 25 is a diagram illustrating an example of a hardware implementation for an example apparatus.

FIG. 25 is a diagram 2500 illustrating an example of a hardware implementation for an apparatus 2502. The apparatus 2502 may be a UE or other wireless device that communicates based on sidelink. The apparatus 2502 includes a baseband processor 2504 (also referred to as a modem) coupled to a RF transceiver 2522 and one or more subscriber identity modules (SIM) cards 2520, an application processor 2506 coupled to a secure digital (SD) card 2508 and a screen 2510, a Bluetooth module 2512, a wireless local area network (WLAN) module 2514, a Global Positioning System (GPS) module 2516, and a power supply 2518. The baseband processor 2504 communicates through the RF transceiver 2522 with the UE 104 and/or BS 102/180. The baseband processor 2504 may include a computer-readable medium/memory. The computer-readable medium/memory may be non-transitory. The baseband processor 2504 is responsible for general processing, including the execution of software stored on the computer-readable medium/memory. The software, when executed by the baseband processor 2504, causes the baseband processor 2504 to perform the various functions described supra. The computer-readable medium/memory may also be used for storing data that is manipulated by the baseband processor 2504 when executing software. The baseband processor 2504 further includes a reception component 2530, a communication manager 2532, and a transmission component 2534. The communication manager 2532 includes the one or more illustrated components. The components within the communication manager 2532 may be stored in the computer-readable medium/memory and/or configured as hardware within the baseband processor 2504. The baseband processor 2504 may be a component of the device 350 and may include the memory 360 and/or at least one of the TX processor 368, the RX processor 356, and the controller/processor 359. In one configuration, the apparatus 2502 may be a modem chip and include just the baseband processor 2504, and in another configuration, the apparatus 2502 may be the entire UE (e.g., see 350 of FIG. 3) and include the additional modules of the apparatus 2502.

The communication manager 2532 includes a paging reception component 2540 that is configured to receive a paging message over sidelink from a second UE, the paging message including paging information indicating a paging type for a page from a base station, e.g., as described in connection with 2402 in FIG. 24. The communication manager 2532 further includes an information component 2542 that is configured to receive information from the base station based on the paging type indicated in the paging message from the second UE, e.g., as described in connection with 2404 in FIG. 24.

The apparatus may include additional components that perform each of the blocks of the algorithm in the aforementioned flowchart of FIG. 24 or any of the aspects performed by the target UE 1208 in FIG. 12. As such, each block in the aforementioned flowchart of FIG. 24 or any of the aspects performed by the target UE 1208 in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. In one configuration, the apparatus 2402, and in particular the baseband processor 2404, includes means for receiving a paging message over sidelink from a second UE (e.g., the paging reception component 2540, the reception component 2530, and/or the RF transceiver 2522), the paging message including paging information indicating a paging type for a page from a base station. The apparatus 2402 includes means for receiving information from the base station based on the paging type indicated in the paging message from the second UE ((e.g., the information component 2542, the reception component 2530, and/or the RF transceiver 2522). The aforementioned means may be one or more of the aforementioned components of the apparatus 2502 configured to perform the functions recited by the aforementioned means. As described supra, the apparatus 2502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following aspects are illustrative only and may be combined with other aspects or teachings described herein, without limitation.

Aspect 1 is a method of wireless communication at a first UE, comprising: receiving, from a base station, a paging relay request message including paging information for a second UE; and transmitting a paging message from the first UE to the second UE over sidelink.

In aspect 2, the method of aspect 1 further includes that the first UE receives the paging information in the paging relay request message including a paging type.

In aspect 3, the method of aspect 1 or aspect 2 further includes that the paging type indicates at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification.

In aspect 4, the method of any of aspects 1-3 further includes that the first UE receives the paging information in the paging relay request message including a message associated with the paging information for the second UE.

In aspect 5, the method of any of aspects 1-4 further includes that the message associated with the paging information includes at least one of: random access resources for the second UE to perform RRC set up, or a sidelink resource for the second UE to perform a unicast connection set up.

In aspect 6, the method of any of aspects 1-5 further includes that the first UE receives the paging relay request message on a PDSCH from the base station.

In aspect 7, the method of any of aspects 1-6 further comprises: indicating a paging type in the paging message that the first UE transmits to the second UE over the sidelink.

In aspect 8, the method of any of aspects 1-7 further includes that the paging type indicates at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification.

In aspect 9, the method of any of aspects 1-8 further includes that the paging relay request message includes one or more (or a list of) paging records, each paging record comprising a UE identity for a UE to which the page is directed and the paging type, the method further comprises: transmitting a dedicated paging message to the second UE based on at least one paging record in the one or more paging records if first UE detects the UE identity for the second UE is comprised in the one or more paging records; and transmitting the one or more paging records in the paging message to the second UE if first UE does not detect the UE identity for the second UE in the one or more paging records.

In aspect 10, the method of any of aspects 1-9 further includes that the first UE transmits an additional message in the paging message to the second UE.

In aspect 11, the method of any of aspects 1-10 further includes that the additional message includes at least one of: random access resources for the second UE to perform RRC set up, or a sidelink resource for the second UE to perform a unicast connection set up.

Aspect 12 is an apparatus for wireless communication at a first UE, comprising: means for receiving, from a base station, a paging relay request message including paging information for a second UE; and means for transmitting a paging message from the first UE to the second UE over sidelink.

In aspect 13, the apparatus of aspect 12 further comprises means to perform the method of any of aspects 2-11.

Aspect 14 is an apparatus for wireless communication at a first UE, comprising: a memory; and at least one processor coupled to the memory and configured to perform the method of any of aspects 1-11.

Aspect 15 is a non-transitory computer-readable medium storing computer executable code for wireless communication at a first UE, the code when executed by a processor cause the processor to perform the method of any of aspects 1-11.

Aspect 16 is a method of wireless communication at a base station, comprising: determining to page a first UE in an inactive state or an idle state; and transmitting, to a second UE, a paging relay request message including paging information, the paging relay request message indicating a request for the second UE to relay paging information to the first UE over sidelink.

In aspect 17, the method of aspect 16 further includes that the base station indicates a paging type in the paging information comprised in the paging relay request message.

In aspect 18, the method of aspect 16 or aspect 17 further includes that the paging type indicates at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification.

In aspect 19, the method of any of aspects 16-18 further includes that the base station transmits a message associated with the paging information for the second UE in the paging relay request message.

In aspect 20, the method of any of aspects 16-19 further includes that the message associated with the paging information includes at least one of: random access resources for the first UE to perform RRC set up, or a sidelink resource for the first UE to perform a unicast connection set up.

In aspect 21, the method of any of aspects 16-20 further includes that the base station transmits the paging relay request message on a PDSCH to the second UE.

Aspect 22 is an apparatus for wireless communication at a base station, comprising: means for determining to page a first UE in an inactive state or an idle state; and means for transmitting, to a second UE, a paging relay request message including paging information, the paging relay request message indicating a request for the second UE to relay paging information to the first UE over sidelink.

In aspect 23, the apparatus of aspect 22 further comprises means to perform the method of any of aspects 17-21.

Aspect 24 is an apparatus for wireless communication at a base station, comprising: a memory; and at least one processor coupled to the memory and configured to perform the method of any of aspects 16-21.

Aspect 25 is a non-transitory computer-readable medium storing computer executable code for wireless communication at a base station, the code when executed by a processor cause the processor to perform the method of any of aspects 16-21.

Aspect 26 is a method of wireless communication at a first UE, comprising: receiving a paging message over sidelink from a second UE, the paging message including paging information indicating a paging type for a page from a base station; and receiving information from the base station based on the paging type indicated in the paging message from the second UE.

In aspect 27, the method of aspect 26 further includes that the paging type indicates at least one of: a first type of page triggering a RRC setup over a Uu interface, or a second type of page triggering the RRC setup over a PC5 interface, a third type of page for a system information modification, a fourth type of page for an ETWS notification, or a fifth type of page for a CMAS notification.

In aspect 28, the method of aspect 26 or aspect 27 further includes that the first UE receives an additional message in the paging message from the second UE.

In aspect 29, the method of any of aspects 26-28 further includes that the additional message includes at least one of: random access resources for the first UE to perform RRC set up, or a sidelink resource for the first UE to perform a unicast connection set up.

Aspect 30 is an apparatus for wireless communication at a base station, comprising: means for receiving a paging message over sidelink from a second UE, the paging message including paging information indicating a paging type for a page from a base station; and means for receiving information from the base station based on the paging type indicated in the paging message from the second UE.

In aspect 31, the apparatus of aspect 30 further comprises means to perform the method of any of aspects 27-29.

Aspect 32 is an apparatus for wireless communication, comprising: a memory; and at least one processor coupled to the memory and configured to perform the method of any of aspects 26-29.

Aspect 33 is a non-transitory computer-readable medium storing computer executable code for wireless communication at a base station, the code when executed by a processor cause the processor to perform the method of any of aspects 26-29.

Aspect 34 is an apparatus for wireless communication including a memory; and at least one processor coupled to the memory, the memory and the at least one processor configured to: receive, from a base station, a paging relay request message including paging information for at least a second UE, each paging information comprising a UE identity for the second UE and a paging type; and transmit a paging message from the first UE to the second UE over sidelink.

Aspect 35 is the apparatus of aspect 33, where the paging relay request message includes the paging information for multiple UEs.

Aspect 36 is the apparatus of any of aspects 34 and 35, where the at least one processor and the memory are further configured to: indicate the paging type in the paging message that the first UE transmits to the second UE over the sidelink.

Aspect 37 is the apparatus of any of aspects 34 to 36, where the paging type indicates at least one of: a first page type triggering an RRC setup over a Uu interface, a second page type triggering the RRC setup over a sidelink interface, a third page type for a system information modification, a fourth page type for an ETWS notification, a fifth page type for a CMAS notification, or a sixth page type for an emergency message or an emergency notification.

Aspect 38 is the apparatus of any of aspects 34 to 37, where the paging relay request message includes one or more paging records, the at least one processor and the memory are further configured to: transmit a dedicated paging message to the second UE based on at least one paging record in the one or more paging records in response to the first UE detecting that the UE identity for the second UE is comprised in the one or more paging records; and transmit the one or more paging records in the paging message to the second UE based on the first UE not detecting the UE identity for the second UE in the one or more paging records.

Aspect 39 is the apparatus of any of aspects 34 to 38, where the at least one processor and the memory are further configured to: receive the paging information in the paging relay request message including a message associated with the paging information for the second UE.

Aspect 40 is the apparatus of any of aspects 34 to 39, where the message associated with the paging information includes at least one of: random access resources for the second UE to perform an RRC set up, or a sidelink resource for the second UE to perform a unicast connection set up.

Aspect 41 is the apparatus of any of aspects 34 to 40, where the at least one processor and the memory are further configured to: receive the paging relay request message on a PDSCH from the base station.

Aspect 42 is the apparatus of any of aspects 34 to 41, where the at least one processor and the memory are further configured to: transmit an additional message in the paging message to the second UE.

Aspect 43 is the apparatus of any of aspects 34 to 42, where the additional message includes at least one of: random access resources for the second UE to perform an RRC set up, or a sidelink resource for the second UE to perform a unicast connection set up.

Aspect 44 is a method of wireless communication for implementing any of aspects 34 to 43.

Aspect 45 is an apparatus for wireless communication including means for implementing any of aspects 34 to 43.

Aspect 46 is a computer-readable medium storing computer executable code, where the code when executed by a processor causes the processor to implement any of aspects 34 to 43.

Aspect 47 is an apparatus for wireless communication including a memory; and at least one processor coupled to the memory, the memory and the at least one processor configured to: generate a paging relay request message including paging information for at least a second UE, the paging information indicating a UE ID for the second UE and a paging type; and transmit, to a first UE, the paging relay request message, the paging relay request message indicating a request for the first UE to relay the paging information to the second UE over sidelink.

Aspect 48 is the apparatus of aspect 47, where the paging relay request message comprises the paging information for multiple UEs.

Aspect 49 is the apparatus of any of aspects 47 and 48, where the at least one processor and the memory are further configured to: indicating the paging type in the paging information comprised in the paging relay request message.

Aspect 50 is the apparatus of any of aspects 47 to 49, where the paging type indicates at least one of: a first page type triggering an RRC setup over a Uu interface, a second page type triggering the RRC setup over a sidelink interface, a third page type for a system information modification, a fourth page type for an ETWS notification, a fifth page type for a CMAS notification, or a sixth page type for an emergency message or an emergency notification.

Aspect 51 is the apparatus of any of aspects 47 to 50, where the at least one processor and the memory are further configured to: transmit a message associated with the paging information for the first UE in the paging relay request message.

Aspect 52 is the apparatus of any of aspects 47 to 51, where the message associated with the paging information includes at least one of: random access resources for the second UE to perform an RRC set up, or a sidelink resource for the second UE to perform a unicast connection set up.

Aspect 53 is the apparatus of any of aspects 47 to 52, where the at least one processor and the memory are further configured to: transmit the paging relay request message on a PDSCH to the first UE.

Aspect 54 is a method of wireless communication for implementing any of aspects 47 to 53.

Aspect 55 is an apparatus for wireless communication including means for implementing any of aspects 47 to 53.

Aspect 56 is a computer-readable medium storing computer executable code, where the code when executed by a processor causes the processor to implement any of aspects 47 to 53.

Aspect 57 is an apparatus for wireless communication including a memory; and at least one processor coupled to the memory, the memory and the at least one processor configured to: receive a paging message over sidelink from a first UE, the paging message including paging information indicating a paging type for a page from a base station; and receive information from the base station based on the paging type indicated in the paging message from the first UE.

Aspect 58 is the apparatus of aspect 57, where the paging type indicates at least one of: a first page type triggering an RRC setup over a Uu interface, a second page type triggering the RRC setup over a sidelink interface, a third page type for a system information modification, a fourth page type for an ETWS notification, a fifth page type for a CMAS notification, or a sixth page type for an emergency message or an emergency notification.

Aspect 59 is the apparatus of any of aspects 57 and 58, where the at least one processor and the memory are further configured to: receive an additional message in the paging message from the first UE, and wherein the additional message includes at least one of: random access resources for the first UE to perform an RRC set up, or a sidelink resource for the first UE to perform a unicast connection set up.

Aspect 60 is a method of wireless communication for implementing any of aspects 57 to 59.

Aspect 61 is an apparatus for wireless communication including means for implementing any of aspects 57 to 59.

Aspect 62 is a computer-readable medium storing computer executable code, where the code when executed by a processor causes the processor to implement any of aspects 57 to 59.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not to be limited to the aspects shown herein, but is to be accorded the full scope consistent with the language claims, wherein reference to an element in the singular is not to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are to be encompassed by the claims. Moreover, nothing disclosed herein is to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), comprising:
    at least one memory; and
    at least one processor coupled to the at least one memory, the at least one processor configured to cause the first UE to:
        receive a paging relay request message including one or more paging records and paging information for at least a second UE, each paging information comprising a UE identity for the second UE and a paging type; and
        transmit a paging message to the second UE over sidelink, wherein the paging message includes the one or more paging records based on the UE identity for the second UE being undetected in the one or more paging records.

2. The apparatus of claim 1, wherein the paging relay request message comprises the paging information for multiple UEs.

3. The apparatus of claim 1, wherein the at least one processor is further configured to cause the first UE to:
    indicate the paging type in the paging message that the first UE transmits to the second UE over the sidelink.

4. The apparatus of claim 1, wherein the paging type indicates at least one of:
    a first page type triggering a radio resource control (RRC) setup over a Uu interface,
    a second page type triggering the RRC setup over a sidelink interface,
    a third page type for a system information modification,
    a fourth page type for an earthquake and tsunami warning system (ETWS) notification,
    a fifth page type for a commercial mobile alert system (CMAS) notification, or
    a sixth page type for an emergency message or an emergency notification.

5. The apparatus of claim 1, wherein the at least one processor is further configured to cause the first UE to:
    transmit a dedicated paging message to the second UE based on at least one paging record in the one or more paging records in response to the first UE detecting that the UE identity for the second UE is comprised in the one or more paging records.

6. The apparatus of claim 1, wherein the at least one processor is further configured to cause the first UE to:
    receive the paging information in the paging relay request message including a message associated with the paging information for the second UE.

7. The apparatus of claim 6, wherein the message associated with the paging information includes at least one of:
    random access resources for the second UE to perform a radio resource control (RRC) set up, or
    a sidelink resource for the second UE to perform a unicast connection set up.

8. The apparatus of claim 1, wherein the at least one processor is further configured to cause the first UE to:
receive the paging relay request message on a physical downlink shared channel (PDSCH).

9. The apparatus of claim 1, wherein the at least one processor is further configured to cause the first UE to:
transmit an additional message in the paging message to the second UE.

10. The apparatus of claim 9, wherein the additional message includes at least one of:
random access resources for the second UE to perform radio resource control (RRC) set up, or
a sidelink resource for the second UE to perform a unicast connection set up.

11. The apparatus of claim 1, wherein to receive the paging relay request message, the at least one processor is configured to:
receive the paging relay request message from a base station.

12. The apparatus of claim 1, wherein the at least one processor is individually or collectively configured to receive the paging relay request message and transmit the paging message.

13. A method of wireless communication at a first user equipment (UE), comprising:
receiving a paging relay request message including one or more paging records and paging information for at least a second UE, each paging information comprising a UE identity for the second UE and a paging type; and
transmitting a paging message to the second UE over sidelink, wherein the paging message includes the one or more paging records based on the UE identity for the second UE being undetected in the one or more paging records.

14. The method of claim 13, wherein the paging relay request message comprises the paging information for multiple UEs.

15. The method of claim 13, further comprising:
indicating the paging type in the paging message that the first UE transmits to the second UE over the sidelink.

16. The method of claim 13, wherein the paging type indicates at least one of:
a first page type triggering a radio resource control (RRC) setup over a Uu interface,
a second page type triggering the RRC setup over a sidelink interface,
a third page type for a system information modification,
a fourth page type for an earthquake and tsunami warning system (ETWS) notification,
a fifth page type for a commercial mobile alert system (CMAS) notification, or
a sixth page type for an emergency message or an emergency notification.

17. The method of claim 13, further comprising:
transmitting a dedicated paging message to the second UE based on at least one paging record in the one or more paging records in response to the first UE detecting that the UE identity for the second UE is comprised in the one or more paging records.

18. The method of claim 13, further comprising:
receiving the paging information in the paging relay request message including a message associated with the paging information for the second UE.

19. The method of claim 18, wherein the message associated with the paging information includes at least one of:
random access resources for the second UE to perform radio resource control (RRC) set up, or
a sidelink resource for the second UE to perform a unicast connection set up.

20. The method of claim 13, further comprising:
receiving the paging relay request message on a physical downlink shared channel (PDSCH).

21. The method of claim 13, further comprising:
transmitting an additional message in the paging message to the second UE.

22. The method of claim 21, wherein the additional message includes at least one of:
random access resources for the second UE to perform radio resource control (RRC) set up, or
a sidelink resource for the second UE to perform a unicast connection set up.

23. The method of claim 13, wherein receiving the paging relay request message comprises:
receiving the paging relay request message from a base station.

24. An apparatus for wireless communication at a base station, comprising:
at least one memory; and
at least one processor coupled to the at least one memory, the at least one processor configured to cause the base station to:
generate a paging relay request message including one or more paging records and paging information for at least a second user equipment (UE), the paging information indicating a UE identity for the second UE and a paging type; and
transmit, for a first UE, the paging relay request message, the paging relay request message indicating a request for the first UE to relay the paging information to the second UE over sidelink and to relay the one or more paging records to the second UE based on the UE identity for the second UE being undetected in the one or more paging records.

25. The apparatus of claim 24, wherein the paging relay request message comprises the paging information for multiple UEs.

26. The apparatus of claim 24, wherein the at least one processor is further configured to cause the base station to:
indicate the paging type in the paging information comprised in the paging relay request message.

27. The apparatus of claim 24, wherein the paging type indicates at least one of:
a first page type triggering a radio resource control (RRC) setup over a Uu interface,
a second page type triggering the RRC setup over a sidelink interface,
a third page type for a system information modification,
a fourth page type for an earthquake and tsunami warning system (ETWS) notification,
a fifth page type for a commercial mobile alert system (CMAS) notification, or
a sixth page type for an emergency message or an emergency notification.

28. The apparatus of claim 24, wherein the at least one processor is further configured to cause the base station to:
transmit a message associated with the paging information for the first UE in the paging relay request message.

29. The apparatus of claim 28, wherein the message associated with the paging information includes at least one of:

random access resources for the second UE to perform a radio resource control (RRC) set up, or
a sidelink resource for the second UE to perform a unicast connection set up.

30. The apparatus of claim 24, wherein the at least one processor is further configured to cause the base station to:
transmit the paging relay request message on a physical downlink shared channel (PDSCH) to the first UE.

31. The apparatus of claim 24, wherein the at least one processor is individually or collectively configured to generate the paging relay request message and transmit the paging relay request message.

32. An apparatus for wireless communication at a second user equipment (UE), comprising:
at least one memory; and
at least one processor coupled to the at least one memory, the at least one processor configured to cause the second UE to:
receive a paging message over sidelink from a first UE, the paging message including paging information indicating a paging type for a page from a base station, wherein the paging message further includes one or more paging records based on a UE identity for the second UE being undetected in the one or more paging records; and
receive information from the base station based on the paging type indicated in the paging message from the first UE.

33. The apparatus of claim 32, wherein the paging type indicates at least one of:
a first page type triggering a radio resource control (RRC) setup over a Uu interface,
a second page type triggering the RRC setup over a sidelink interface,
a third page type for a system information modification,
a fourth page type for an earthquake and tsunami warning system (ETWS) notification,
a fifth page type for a commercial mobile alert system (CMAS) notification, or
a sixth page type for an emergency message or an emergency notification.

34. The apparatus of claim 32, wherein the at least one processor is further configured to cause the second UE to:
receive an additional message in the paging message from the first UE, and wherein the additional message includes at least one of:
random access resources for the first UE to perform a radio resource control (RRC) set up, or
a sidelink resource for the first UE to perform a unicast connection set up.

35. The apparatus of claim 32, wherein the at least one processor is individually or collectively configured to receive the paging message and receive the information.

36. A non-transitory computer-readable storage medium storing computer executable code at a first user equipment (UE), the code when executed by a processor causes the processor to:
receive a paging relay request message including one or more paging records and paging information for at least a second UE, each paging information comprising a UE identity for the second UE and a paging type; and
transmit a paging message to the second UE over sidelink, wherein the paging message includes the one or more paging records based on the UE identity for the second UE being undetected in the one or more paging records.

37. The non-transitory computer-readable storage medium of claim 36, wherein the code when executed by the processor further causes the processor to:
indicate the paging type in the paging message that the first UE transmits to the second UE over the sidelink.

38. The non-transitory computer-readable storage medium of claim 36, wherein the code when executed by the processor further causes the processor to:
transmit a dedicated paging message to the second UE based on at least one paging record in the one or more paging records in response to the first UE detecting that the UE identity for the second UE is comprised in the one or more paging records.

39. The non-transitory computer-readable storage medium of claim 36, wherein the code when executed by the processor further causes the processor to:
receive the paging information in the paging relay request message including a message associated with the paging information for the second UE.

40. The non-transitory computer-readable storage medium of claim 36, wherein to receive the paging relay request message, the code when executed by the processor causes the processor to:
receive the paging relay request message from a base station.

41. A method of wireless communication at a base station, comprising:
generating a paging relay request message including one or more paging records and paging information for at least a second user equipment (UE), the paging information indicating a UE identity for the second UE and a paging type; and
transmitting, for a first UE, the paging relay request message, the paging relay request message indicating a request for the first UE to relay the paging information to the second UE over sidelink and to relay the one or more paging records to the second UE based on the UE identity for the second UE being undetected in the one or more paging records.

42. The method of claim 41, further comprising:
indicating the paging type in the paging information comprised in the paging relay request message.

43. The method of claim 41, further comprising:
transmitting a message associated with the paging information for the first UE in the paging relay request message.

44. A non-transitory computer-readable storage medium storing computer executable code at a base station, the code when executed by a processor causes the processor to:
generate a paging relay request message including one or more paging records and paging information for at least a second user equipment (UE), the paging information indicating a UE identity for the second UE and a paging type; and
transmit, for a first UE, the paging relay request message, the paging relay request message indicating a request for the first UE to relay the paging information to the second UE over sidelink and to relay the one or more paging records to the second UE based on the UE identity for the second UE being undetected in the one or more paging records.

45. The non-transitory computer-readable storage medium of claim 44, wherein the code when executed by the processor further causes the processor to:
indicate the paging type in the paging information comprised in the paging relay request message.

46. The non-transitory computer-readable storage medium of claim 44, wherein the code when executed by the processor further causes the processor to:
  transmit a message associated with the paging information for the first UE in the paging relay request message.

47. A method of wireless communication at a second user equipment (UE), comprising:
  receiving a paging message over sidelink from a first UE, the paging message including paging information indicating a paging type for a page from a base station, wherein the paging message further includes one or more paging records based on a UE identity for the second UE being undetected in the one or more paging records; and
  receiving information from the base station based on the paging type indicated in the paging message from the first UE.

48. The method of claim 47, further comprising:
  receiving an additional message in the paging message from the first UE.

49. A non-transitory computer-readable storage medium storing computer executable code at a second user equipment (UE), the code when executed by a processor causes the processor to:
  receive a paging message over sidelink from a first UE, the paging message including paging information indicating a paging type for a page from a base station, wherein the paging message further includes one or more paging records based on a UE identity for the second UE being undetected in the one or more paging records; and
  receive information from the base station based on the paging type indicated in the paging message from the first UE.

50. The non-transitory computer-readable storage medium of claim 49, wherein the code when executed by the processor further causes the processor to:
  receive an additional message in the paging message from the first UE.

* * * * *